(12) United States Patent
Kobayashi et al.

(10) Patent No.: US 8,035,334 B2
(45) Date of Patent: Oct. 11, 2011

(54) ELECTRIC POWER CONVERTER

(75) Inventors: Takahiko Kobayashi, Tokyo (JP);
Yoshihiko Kimpara, Tokyo (JP);
Manabu Yoshimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 378 days.

(21) Appl. No.: 12/440,934

(22) PCT Filed: Oct. 31, 2006

(86) PCT No.: PCT/JP2006/321780
§ 371 (c)(1),
(2), (4) Date: Mar. 12, 2009

(87) PCT Pub. No.: WO2008/053538
PCT Pub. Date: May 8, 2008

(65) Prior Publication Data
US 2010/0039056 A1  Feb. 18, 2010

(51) Int. Cl.
*H02P 3/18* (2006.01)
*H02P 21/00* (2006.01)

(52) U.S. Cl. ............... 318/812; 318/400.02; 318/400.26

(58) Field of Classification Search .................. 318/139, 318/400.02, 400.26, 453, 812
See application file for complete search history.

(56) References Cited

U.S. PATENT DOCUMENTS

| | | |
|---|---|---|
| 5,436,819 A | 7/1995 | Mikami et al. |
| 7,528,568 B2 * | 5/2009 | Tobari et al. ............... 318/723 |
| 2007/0024232 A1 * | 2/2007 | Suzuki et al. ............... 318/812 |

FOREIGN PATENT DOCUMENTS

| | | |
|---|---|---|
| JP | 9 47039 | 2/1997 |
| JP | 2756049 | 3/1998 |
| JP | 3245989 | 11/2001 |
| JP | 3287186 | 3/2002 |
| JP | 2002 272182 | 9/2002 |
| JP | 2004 112879 | 4/2004 |

OTHER PUBLICATIONS

Sugimoto, et al., "Practice of Theory and Design on AC Servo System" Sougoudenshi Shuppansha, pp. 54-57 lines 9 in p. 55 and line 5 in p. 57, 1990, (with partial English abstract).
Murai, Y. et al., "Three-Phase Current-Waveform-Detection on PWM Inverters from DC Link Current-Steps", IPEC-YOKOHAMA, pp. 271-275, (1995).

* cited by examiner

*Primary Examiner* — Derek Rosenau
(74) *Attorney, Agent, or Firm* — Oblon, Spivak, McClelland, Maier & Neustadt, L.L.P.

(57) ABSTRACT

A voltage-command correction unit provided between an electric-power conversion unit and a voltage-command calculation unit provides a predetermined current range including the zero level for the detected output current, and, at a first clock time when the output current enters from outside to inside of the current range, sets a zero cross timing of the output current as a clock time for switching the polarity of the correction voltage that corrects the AC voltage command calculated and output by the voltage-command calculation unit based on the first clock time and the frequency, thereby making a configuration capable of correcting the AC voltage command with the correction voltage with the same polarity as the polarity of the output current around the zero cross point of the output current.

16 Claims, 14 Drawing Sheets

38
CORRECTION VOLTAGE Δvx POLARITY
SWITCHING CLOCK TIME (1) PERIOD TO SET POLARITY OF CORRECTION VOLTAGE TO SAME AS POLARITY OF CURRENT
(2) PERIOD TO SET POLARITY OF CORRECTION VOLTAGE TO SAME AS IN PERIOD (1)
(3) PERIOD TO SET POLARITY OF CORRECTION VOLTAGE TO REVERSED POLARITY IN PERIOD (1)

ELECTRIC POWER CONVERTER

TECHNICAL FIELD

The present invention relates to an electric power converter that supplies an AC power to an AC load.

BACKGROUND ART

An electric power converter, in which power device elements of upper and lower arms that configure an electric-power conversion unit provided at an output stage generate an AC voltage by performing a switching operation based on a voltage command to output the AC voltage to an AC load, provides a period to control the power device elements of the upper and lower arms into off-operation states at the same time for the purpose of preventing a short circuit due to simultaneous conduction of the power device elements of the upper and lower arms. This period is called a dead time; with this dead time, an error is known to occur between a voltage command that the electric-power conversion unit receives and a voltage that the electric-power conversion unit actually outputs to the load based on the voltage command. The error voltage caused by this dead time becomes a voltage with a polarity reversed with respect to the polarity of an output phase current of the electric-power conversion unit.

In order to correct the voltage error caused by this dead time, a method for detecting the output phase current of the electric-power conversion unit by a current-detecting unit provided in the electric power converter and applying a voltage with the same polarity as the detected output phase current to give a corrected voltage command to the electric-power conversion unit is known (for example, Non-patent Document 1). As a method for detecting a current, not only a method for directly detecting the output phase current of the electric-power conversion unit but also a method for detecting the output phase current from a DC link current of the electric-power conversion unit are known (for example, Non-patent Document 2).

However, near a current zero cross point where the polarity of the output phase current switches, because the absolute value of the output phase current is small, accurately detecting the polarity of the output phase current is very difficult. In addition, near the current zero cross point, because the output phase current causes chattering, the correction method of adding a voltage with the same polarity as the polarity of the output phase current to the voltage command may cause a polarity error of a correction voltage added to the voltage command, or a phenomenon in which the polarity of the correction voltage continuously switches between a positive and a negative voltages, alternately.

For this reason, various proposals have been conventionally made to prevent the problem of dead-time correction near the current zero cross point where the absolute value of the output phase current is low (for example, Patent Documents 1 to 4).

Specifically, Patent Documents 1 discloses an example of configuring an output voltage error correction apparatus of an inverter apparatus, which corrects an output voltage error caused by a short-circuit prevention period of the output voltage of the inverter apparatus, to include a current detection unit that detects the output current of the inverter apparatus, a current polarity judgment unit that judges the polarity of the output current detected by this current detection unit, and the voltage error correction unit that, for a threshold value set for the output current, if the output current of the inverter apparatus is outside the threshold value, corrects the output voltage by the polarity of the judged output voltage, and if the output current of the inverter apparatus is within the threshold value, corrects the output voltage by the polarity of the voltage command.

Moreover, Patent Documents 2 discloses an example of configuring an inverter that directly converts DC to AC by bridge-connecting to the arms, which are semiconductor elements, and when controlling the inverter by giving a pulse-width modulated voltage signal, which is obtained by comparing the magnitude relation between a voltage command signal and a carrier signal, to the bridge-connected upper or lower side arm element, configuring a control circuit of a pulse-width modulation control inverter provided with an on delay time for preventing a simultaneous on of the upper and lower side arm elements to include a current polarity judgment unit for outputting a signal to judge the polarity of this output current when the output current of the inverter exceeds a predetermined positive or negative value, a voltage polarity judgment unit for outputting a signal to judge the polarity of the voltage command signal, a first compensation amount calculation unit for calculating the amount to compensate an error voltage occurred in the output voltage of the inverter due to the on delay time, a compensation amount distribution unit for outputting the first compensation amount calculation value in a state where the polarity of the first compensation amount calculation value corresponds to the current polarity and the voltage polarity, and an addition unit for adding the output value of the compensation amount distribution unit to the voltage command signal to make the added value a new voltage command signal.

Moreover, Patent Documents 3 discloses an example of configuring an AC motor drive apparatus that includes a current detection unit for detecting a current flowing into an AC motor, a deviation current calculation unit for calculating a deviation current from a command current and the detected current, a current control unit for calculating a command voltage from the deviation current, a dead time compensation unit, which includes the current polarity judgment unit for determining the current polarity, for outputting a dead time compensation voltage, a voltage addition calculation unit for adding the dead time compensation voltage to the command voltage calculated from the current control unit to calculate a final command voltage, and a PWM electric power conversion apparatus for converting from an AC voltage to a DC voltage using the information on the final command voltage obtained from the voltage addition calculation unit; wherein the dead time compensation unit includes a command current polarity judgment unit for judging a command current polarity from a command current, a detection current polarity judgment unit for judging a detection current polarity from a detected current, and a final current polarity judgment unit for judging a final current polarity from the information on the command current polarity and the detection current polarity.

Furthermore, Patent Documents 4 discloses an example of configuring a PWM control inverter apparatus in which a voltage correction unit for correcting an inverter output voltage by the error voltage calculated using an upper-and-lower-arm short-circuit prevention period, a PWM carrier frequency, and a DC voltage corrects the inverter output voltage in accordance with the polarity of the inverter output current when the absolute value of the inverter output current is larger than a predetermined value and corrects the inverter output voltage in accordance with the polarity of the inverter output voltage when the absolute value of the inverter output current is smaller than the predetermined value; wherein a PWM carrier setting unit that sets the PWM carrier frequency is configured so that the PWM carrier frequency keeps the value of the frequency thereof when the error voltage is smaller than the inverter output voltage, and the PWM carrier frequency is changed so as to keep the ratio between the error voltage and the inverter output voltage constant when the error voltage is larger than the inverter output voltage.

Patent Document 1: Japanese Patent No. 2756049 (Page 16, FIG. 11)
Patent Document 2: Japanese Patent No. 3245989 (Page 12, FIG. 7)
Patent Document 3: Japanese Patent Application Laid-open No. 2004-112879 (Page 6, FIG. 2)
Patent Document 4: Japanese Patent No. 3287186 (Page 8, FIG. 3)
Non-patent Document 1: Sugimoto, Koyama, and Tamai: Practice of Theory and Design on AC Servo System: Sougoudenshi Shuppansha (9th line in Page 55 to 5th line in Page 57)
Non-patent Document 2: "Three-Phase Current-Waveform-Detection on PWM Inverters from DC Link Current-Steps" IPEC-Yokohama'95 p.p. 271-275)

DISCLOSURE OF INVENTION

Problem to be Solved by the Invention

However, such a conventionally proposed correction method cannot definitely switch the polarity of the correction voltage at the zero cross point of the output phase current; and because the output phase current shifts around the zero cross point at the moment when the polarity reverses, a voltage error occurs between the corrected voltage command entering into the electric-power conversion unit, that is, the voltage command to which the correction voltage is added and the output voltage from the electric-power conversion unit near the zero cross point of the output phase current.

This voltage error becomes prominent, in particular when a low frequency AC voltage is output from the electric-power conversion unit. When a rotary machine is connected, rotational irregularity increases due to this voltage error, degrading driving performance. In addition, there are problems such as that the rotational irregularity becomes prominent at a low speed driving.

The present invention has been achieved in view of the above discussion, and it is an object of the present invention to provide an electric power converter that accurately corrects the voltage error caused by a dead time near the zero cross point of the output current, and output an AC power just as the voltage command from the electric-power conversion unit.

Means for Solving Problem

To achieve the above object, the present invention provides an electric power converter that includes an electric-power conversion unit that generates an AC power to be supplied to an AC load in accordance with an AC voltage command input thereto, a voltage-command calculation unit that calculates an AC voltage command with a frequency to be applied to the electric-power conversion unit, and a current detection unit that obtains an output current that is a current component in the AC power that the electric-power conversion unit supplies to the AC load, the electric power converter including a voltage-command correction unit that is provided between the electric-power conversion unit and the voltage-command calculation unit, and that calculates, based on a voltage error caused by a dead time in the electric-power conversion unit, a correction voltage to correct the AC voltage command that the voltage-command calculation unit has obtained, adds the correction voltage to the AC voltage command that the voltage-command calculation unit has obtained, and applies the AC voltage command to the electric-power conversion unit, wherein the voltage-command calculation unit provides a predetermined current range including a zero level for the output current, and, at a first clock time when a value of the output current enters from outside to inside of the current range, obtains a zero cross timing of the output current using the first clock time and the frequency, and sets the zero cross timing as a clock time for switching a polarity of the correction voltage.

According to the present invention, because the polarity of the correction voltage to correct the AC voltage command can be switched at the moment when the detected output current becomes zero, that is, because the AC voltage command is corrected at the correction voltage with the same polarity as the polarity of the output current around the zero cross point of the output current, the voltage error caused by a dead time between the corrected AC voltage command to give the electric-power conversion unit near the zero cross point of the output current and the voltage that the electric-power conversion unit outputs can be reduced, and the electric-power conversion unit becomes able to output the AC power just as the AC voltage command. Therefore, when the output of the electric-power conversion unit is given to a rotary machine, the rotational irregularity of the rotary machine can be reduced, enhancing the operational performance thereof.

Effect of the Invention

According to the present invention, because the voltage error caused by a dead time near the zero cross point of the output current can be reduced with high accuracy, the electric-power conversion unit can output the AC power just as the AC voltage command.

Figure 1:
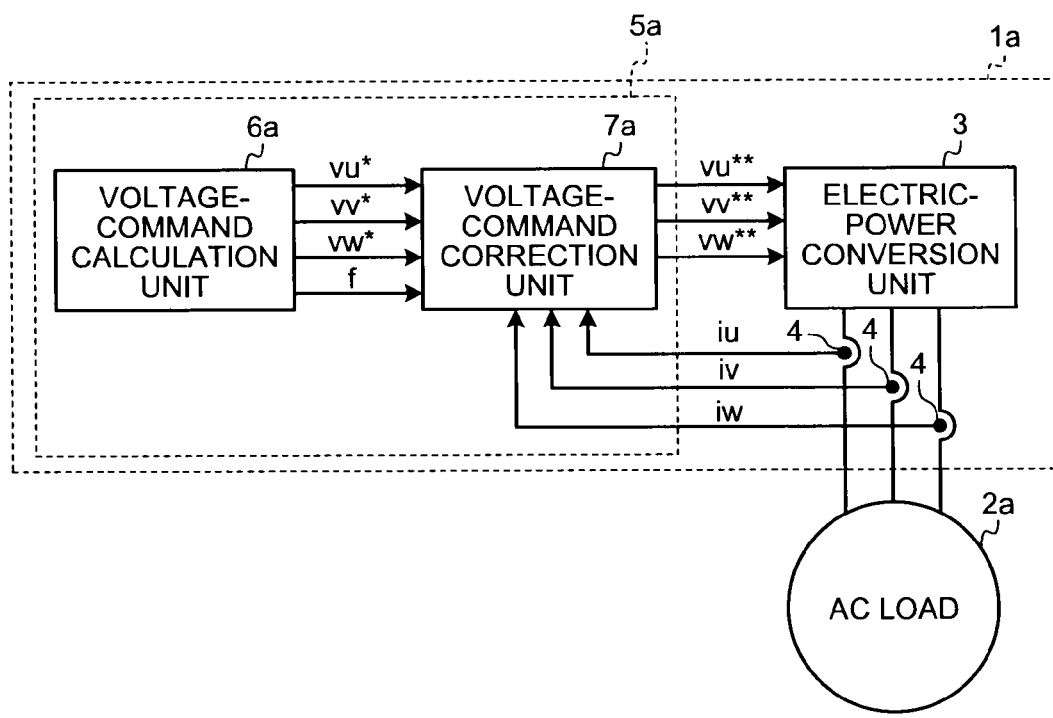
FIG. 1 is a block diagram illustrating a configuration of an electric power converter according to a first embodiment of the present invention.

EXPLANATIONS OF LETTERS OR NUMERALS 1a, 1b Electric power converter
2a AC load
2b Rotary machine as an example of the AC load
3 Electric-power conversion unit
4 Current detection unit
5a, 5b Control device
6a, 6b Voltage-command calculation unit
7a, 7b Voltage-command correction unit
8 Torque command setting unit

BEST MODE(S) FOR CARRYING OUT THE INVENTION

Exemplary embodiments of an electric power converter according to the present invention will be explained below in detail with reference to the accompanying drawings.

First Embodiment

FIG. 1 is a block diagram illustrating a configuration of an electric power converter according to a first embodiment of the present invention. In the first embodiment and each embodiment shown below, an example of an electric power converter that outputs a three-phase AC power will be explained, and yet the explained contents can be applicable to an electric power converter that outputs a single-phase AC power as well.

An electric power converter 1a shown in FIG. 1 includes an electric-power conversion unit 3 to which a three-phase AC load 2a is to be connected, current detection units 4, and a control device 5a that controls the electric-power conversion unit 3 for performing an AC power supply control from the electric-power conversion unit 3 to the AC load 2a. The control device 5a includes a voltage-command calculation unit 6a and a voltage-command correction unit 7a. The voltage-command correction unit 7a is provided between the output side of the voltage-command calculation unit 6a and the input side of the electric-power conversion unit 3.

The electric-power conversion unit 3 generates an AC voltage by power device elements of upper and lower arms performing a switching operation based on an AC voltage command (in FIG. 1, the AC voltage commands vu, vv, vw that the voltage-command correction unit 7a outputs) input from the control device 5a and outputs the AC voltage to the AC load 2a. The control device 5a causes the AC voltage command (in FIG. 1, the AC voltage commands vu, vv, vw that the voltage-command correction unit 7a outputs) given to the electric-power conversion unit 3 to include a dead time voltage command to control the power device elements of the upper and lower arms to an off-operation state at the same time for the purpose of preventing a short circuit due to the simultaneous conduction of the power device elements of the upper and lower arms.

The current detection unit 4 is an example of a current detection unit, described in the present invention, that obtains necessary information on the current when the present invention is put into practice for the electric power converter 1a (the control device 5a). Because the purpose of the present specification lies mainly in explaining the voltage-command correction unit 7a provided in the control device 5a, an output (three-phase output currents iu, iv, iw) from the current detection units 4 is made given to the voltage-command correction unit 7a.

In what follows, specific contents of the current detection unit, described in the present invention, that obtains the necessary information on the current when the present invention is put into practice for the electric power converter 1a (the control device 5a) are described. As a specific example, the current detection unit 4 that directly detects the output current from the electric-power conversion unit 3 is shown in FIG. 1. When detecting the current directly, it is shown in FIG. 1 that the current detection units 4 are arranged for all the three-phase output lines to detect all three phase output currents iu, iv, iw from the electric-power conversion unit 3. However, it is not necessarily required to arrange the current detection units 4 for all the three-phase output lines, but it can be possible to arrange the current detection units 4 for two phase output lines among three phases, detect two phase output currents, and calculate a remaining one phase output current because there is a relationship iu+iv+iw=0. In addition to the situation in which the current of each phase is directly detected is shown in FIG. 1, a method of detecting the output current from the DC link current of the electric-power conversion unit 3 introduced in, for example, Non-Patent Document 2 also can be used. Furthermore, the necessary information on the current when the present invention is put into practice for the electric power converter 1a (the control device 5a) has various aspects related to the configuration method of the voltage-command calculation unit, so these aspects are described below.

First, the voltage-command calculation unit 6a, which calculates the (three-phase) AC voltage commands vu*, vv*, vw* with a frequency f that should be originally given to the electric-power conversion unit 3, can have a configuration to output the AC voltage commands vu*, vv*, vw* by amplifying the difference between the three-phase output currents iu, iv, iw obtained by the current detection units 4 and current commands iu*, iv*, iw* desired to be output from the electric-power conversion unit 3. In this situation, the necessary information on the current when the present invention is put into practice for the electric power converter 1a (the control device 5a) can be either one of the output currents iu, iv, iw or the current commands iu*, iv*, iw*.

In addition, when the AC load 2a is a three-phase rotary machine, the voltage-command calculation unit 6a can also have a configuration to include a flux observer inside thereof and calculate the AC voltage commands vu*, vv*, vw* using the output currents iu, iv, iw converted using an estimated flux inside the rotary machine and a constant of the rotary machine. The output currents iu, iv, iw obtained with such a calculation are included in the necessary information on the current when the present invention is put into practice for the electric power converter 1a (the control device 5a).

The output currents iu, iv, iw and the current commands iu*, iv*, iw* obtained with various methods explained above are information indicating current components in the AC power that the electric-power conversion unit 3 supplies to the AC load 2a. The current detection unit described in the present invention includes all units that obtain the output currents iu, iv, iw and the current commands iu*, iv*, iw* as explained above. This is the same even when the electric power converter 1a outputs a single-phase AC power. In what follows, to facilitate the understanding of the present embodiment, in accordance with a configuration shown in FIG. 1, the present embodiment will be explained under the assumption that the current detection units 4 give the directly detected three-phase output currents iu, iv, iw to the voltage-command correction unit 7a.

Next, the frequency f employed in the voltage-command calculation unit 6a is the frequency of the AC voltage commands vu*, vv*, vw*, that is, the frequency of the AC power output from the electric-power conversion unit 3. In the steady state, the frequency of the output AC power is the same as the frequencies of the output currents iu, iv, iw, the current commands iu*, iv*, iw*, and output voltages vu, vv, vw from the electric-power conversion unit 3. When the AC load 2a is a synchronous machine, the frequency of the AC power output is also the same as the rotation frequency (electric angle) thereof.

When the AC load 2a is an induction machine, a difference occurs between the frequency of the AC power output from the electric-power conversion unit 3 and the rotation frequency (electric angle) of the induction machine by a slip frequency. The slip frequency is calculated using the publicly known technique, the slip frequency is added to the rotation frequency to obtain the frequency of AC power output from the electric-power conversion unit 3, and the frequency can be made as the frequency f.

Now, the voltage-command correction unit 7a calculates correction voltages Δvu, Δvv, Δvw to correct the AC voltage commands vu*, vv*, vw* obtained by the voltage-command calculation unit 6a and adds the correction voltages Δvu, Δvv, Δvw to the AC voltage commands vu*, vv*, vw* for each phase to output the AC voltage commands vu, vv, vw to the electric-power conversion unit 3. Therefore, the AC voltage command vu is expressed by vu**=vu*+Δvu, the AC voltage command vv is expressed by vv=vv*+Δvv, and the AC voltage command vw is expressed by vw=vw*+Δvw.

Figure 2:
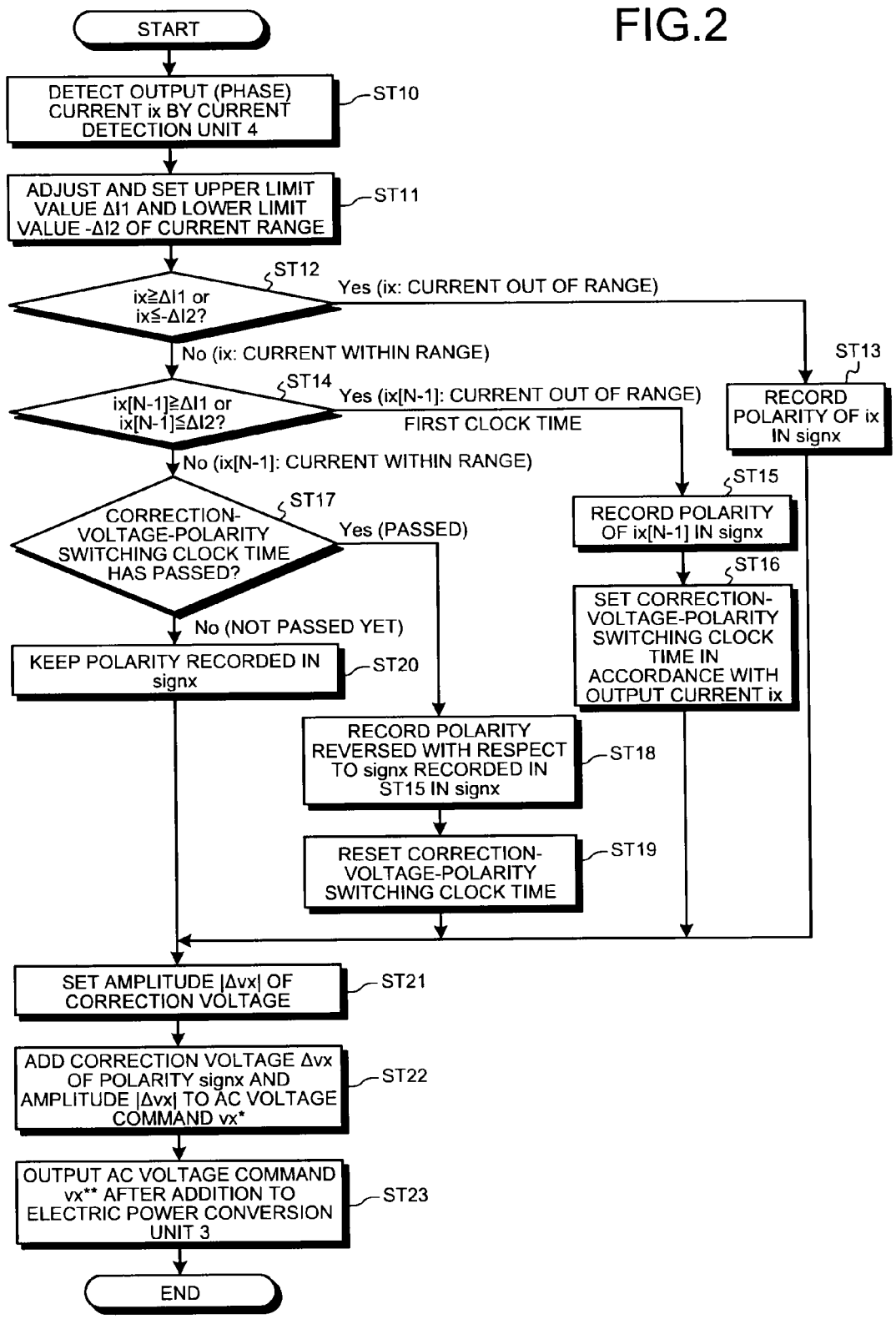
FIG. 2 is a flowchart illustrating a procedure of a correction operation by a voltage-command correction unit shown in FIG. 1.

On this occasion, the voltage-command correction unit 7a executes the processing to accurately reduce the voltage error near the zero cross point of the output voltages iu, iv, iw caused by the dead time that is set for the purpose of preventing a short circuit due to the simultaneous conduction of the power device elements of the upper and lower arms that configure the electric-power conversion unit 3 based on the output currents iu, iv, iw, with a procedure shown, for example, in FIG. 2.

Hereinafter, the correction operation of the voltage error caused by the dead time that the voltage-command correction unit 7a performs in accordance with the first embodiment will be explained with reference to FIG. 1 to FIG. 7. In this regard, because the correction operation is performed for each phase of u, v, w, to make the explanation simple, the correction operation is explained by denoting each phase of u, v, was x. That is, each phase of current is denoted as ix and each phase of voltage is denoted as vx.

Figure 3:
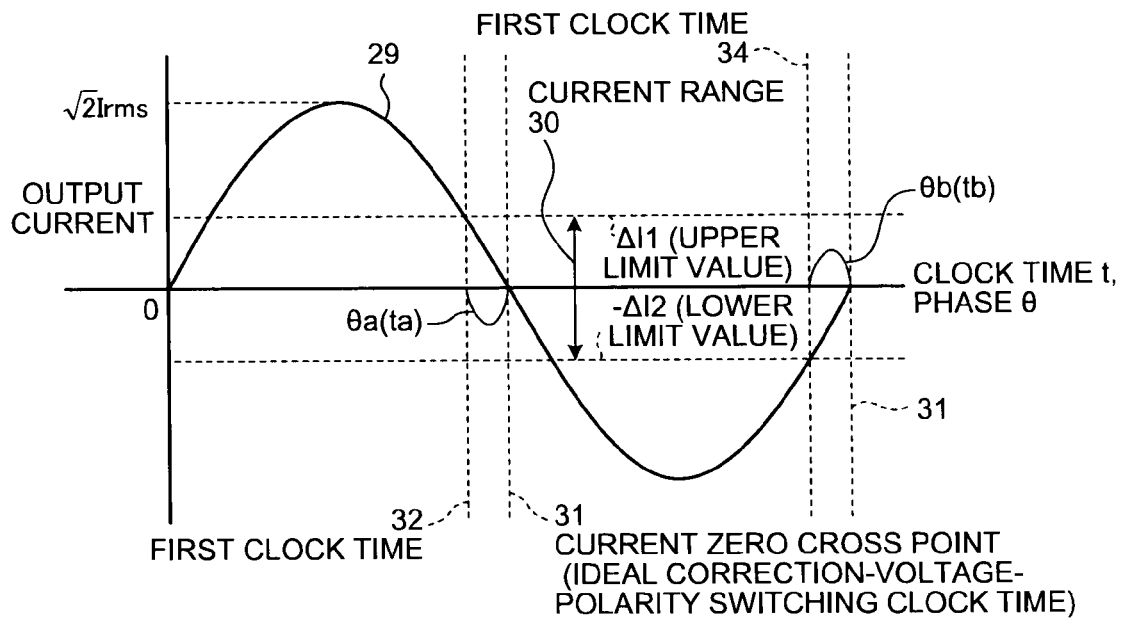
FIG. 3 is a diagram illustrating contents of processing in ST10 to ST16 shown in FIG. 2.
Figure 4:
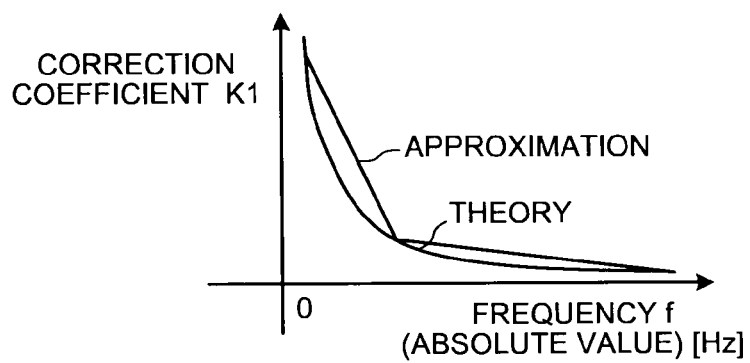
FIG. 4 is a diagram showing an example of a relation property table between a frequency and a correction coefficient K1 used in the processing of ST16 shown in FIG. 2.
Figure 5:
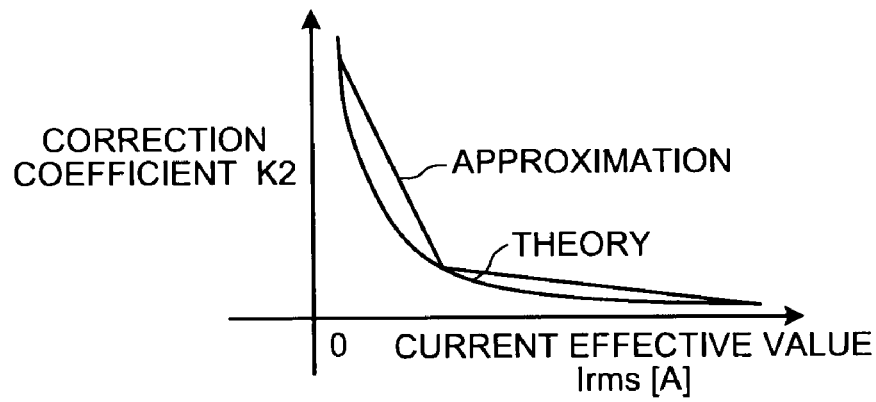
FIG. 5 is a diagram showing an example of a relation property table between an output current and a correction coefficient K2 used in the processing of ST16 shown in FIG. 2.
Figure 6:
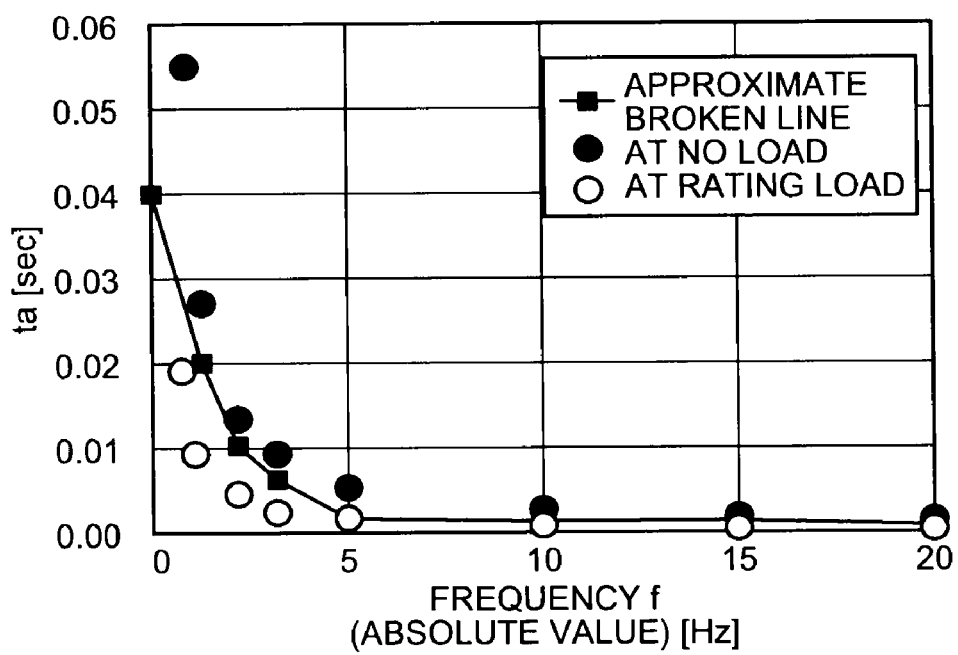
FIG. 6 is a diagram showing an example of a relation property table between a frequency and a time variation amount table used when a load is an induction machine in the processing of ST16 shown in FIG. 2.
Figure 7:
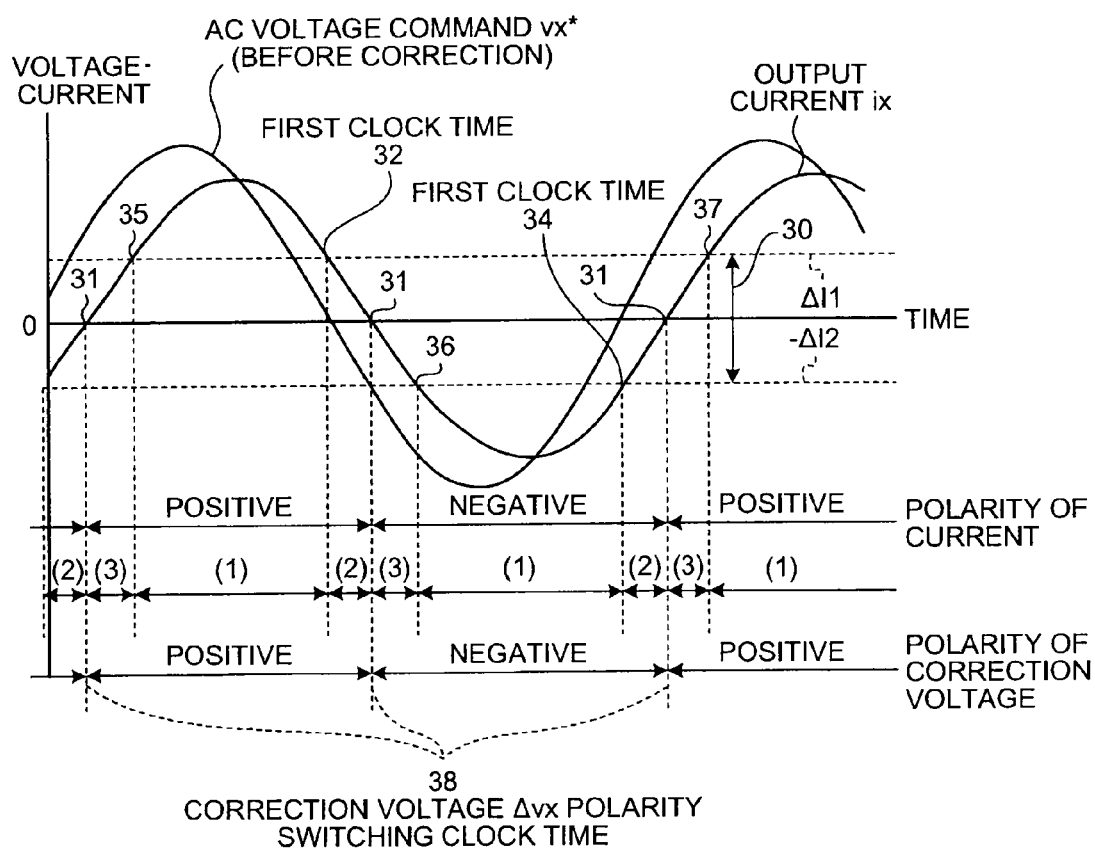
FIG. 7 is a time chart illustrating collectively a correction operation of a voltage error caused by a dead time realized by the correction processing shown in FIG. 2.

FIG. 2 is a flowchart illustrating a procedure of the correction operation by the voltage-command correction unit 7a. In FIG. 2, a step showing a processing procedure is abbreviated to ST. FIG. 3 is a diagram illustrating contents of the processing in ST10 to ST16 shown in FIG. 2. FIG. 4 is a diagram showing an example of a relation property table between a frequency and a correction coefficient K1 used in the processing of ST16 shown in FIG. 2. FIG. 5 is a diagram showing an example of a relation property table between an output current and a correction coefficient K2 used in the processing of ST16 shown in FIG. 2. FIG. 6 is a diagram showing an example of a relation property table between a frequency and a time variation amount ta used when a load is an induction machine in the processing of ST16 shown in FIG. 2. FIG. 7 is a time chart illustrating collectively a correction operation of a voltage error caused by a dead time realized by the correction processing shown in FIG. 2.

In FIG. 2, in ST10, the voltage-command correction unit 7a picks up one phase output current ix among three phase output currents detected by the current detection unit 4, and detects the current thereof. In FIG. 3, the horizontal axis shows time t and phase 0, and the vertical axis shows the amplitude (the effective value Irms) of the detected one phase output current ix. The numeral 29 shown in FIG. 3 shows a waveform in one cycle of the one phase output current ix detected in such a way.

In ST11, the voltage-command correction unit 7a determines a predetermined current range 30 including a zero level in the one cycle of the one phase output current 29 shown in FIG. 3 by adjusting and setting an upper limit value ΔI1 from the zero level to the positive polarity side thereof and a lower limit value −ΔI2 from the zero level to the negative polarity side thereof. The value (the absolute value) of the upper limit value ΔI1 and the lower limit value −ΔI2 can be set to the same value. Also, by taking a fact that an offset is sometimes added to the output current ix depending on the performance of the current detection unit 4 into account, the upper limit value ΔI1 and the lower limit value −ΔI2 can be adjusted to a different value with each other. At any rate, it is important to adjust and set the upper and lower limit values of the current range 30 so that the detection of the polarity of the output current ix is not failed due to a phenomenon in which the output current ix is detected with an offset is added to the output current ix in the current detection unit 4 or a phenomenon of current chattering near the zero cross point of the current. Specific adjusting and setting methods of the predetermined current range 30 including the zero level have various types, so these methods are collectively described below.

In ST12, the voltage-command correction unit 7a judges whether the value of the output current ix is greater than or equal to the upper limit value ΔI1, or less than or equal to the lower limit value −ΔI2, that is, whether the value of the output current ix detected with the sample timing is out of the current range 30. As a result, if the value of the output current is out of the current range 30 (ST12: Yes), the polarity of the output current ix is recorded in a polarity setting signal sign (ST13), each processing of ST21 to ST23 is executed, the value of the output current ix detected with a previous sample timing is updated by the value of the output current ix detected with the sample timing, and the system control proceeds to the processing of ST10 with a next sample timing.

In ST12 gone through ST10 and ST11 that were executed with a sample timing after that, if the value of the output current ix detected with the sample timing is within the current range 30 (ST12: No), the voltage-command correction unit 7a judges, in ST14, whether the value of a detected value ix[N−1] of the output current ix before one sample timing is greater than or equal to the upper limit value ΔI1, or less than or equal to the lower limit value—ΔI2, that is, whether the value of the output current ix before one sample timing was out of the current range 30.

More specifically, in ST14, the voltage-command correction unit 7a checks, when the value of the output current ix detected with the sample timing is within the current range 30 (ST12: No), whether it means that the value of the output current ix detected with the sample timing has entered within the current range 30 for the first time from outside the current range 30, or whether it means that the value of the output current ix detected before one sample timing has already entered within the current range 30 and keeps a state in which the value of the output current ix detected with the sample timing is within the current range 30.

When the voltage-command correction unit 7a judges that the value of the output current ix detected with the sample timing has entered within the current range 30 for the first time from outside the current range 30 (ST14: Yes), the voltage-command correction unit 7a detects clock times when the output current ix changed from outside the range into within the current range 30 as first clock times (32 and 34 shown in FIG. 3), and execute each processing of ST15 and ST16. Although the processing order of ST15 and ST16 can be replaced, in ST15, the polarity of the detected value ix[N−1] of the output current ix before one sample timing is recorded in the polarity setting signal sign, and in ST16, at the first clock times (32 and 34 shown in FIG. 3) when the output current ix changed from outside the range into within the current range 30, the clock time for switching the polarity of a correction voltage Δvx to correct the AC voltage command vx* is set as described below.

Because the voltage error, which is caused by the dead time occurred near the zero cross point of the output current ix, between the AC voltage command vx* and the output voltage vx from the electric-power conversion unit 3 mainly occurs at a voltage with a polarity reversed with respect to the polarity of the output current, to perform the voltage correction accurately, it is only necessary to add the correction voltage Δvx having the same polarity as the polarity of the output current ix to the AC voltage command vx* around a zero cross point 31 of the output current ix in FIG. 3. That is, the zero cross point 31 of the output current ix is an ideal correction polarity voltage switching clock time. In ST16, with this situation in mind, at the first clock times 32 and 34, the clock time when the polarity of the output current ix switches, that is, the zero cross point 31 of the output current ix is obtained based on the first clock time 32, the frequency f, and the output current ix, and the clock time for switching the polarity of the correction voltage Δvx is set so as to match the timing of the current zero cross point 31 at which the polarity of the output current ix switches.

To set the clock time for switching this correction voltage Δvx, first, it is necessary to accurately obtain a time variation amount or a phase variation amount from the first clock times 32 and 34 to the current zero cross point 31 at which the polarity of the output current ix switches, so the time variation amount or the phase variation amount is obtained as a theoretical value as described below.

In FIG. 3, when the output current ix has a positive polarity, the phase variation amount θa from the first clock time 32, when the value (the effective value Irms) of the output current ix changes from outside the range into within the current range 30, to the current zero cross point 31 at which the polarity of the output current ix switches is obtained by applying the value (the effective value Irms) of the output current ix and the upper limit value ΔI1 to Equation (1). To obtain Equation (1), the period of time from the first clock time 32 to the current zero cross point 31 at which the polarity of the output current ix switches is assumed to be sufficiently short compared with the AC cycle.

[Equation 1]

$$\theta a \cong \sin\theta a = \frac{\Delta I1}{\sqrt{2}\, Irms} \quad [\text{rad}] \qquad (1)$$

Moreover, by converting the phase variation amount θa obtained using Equation (1) into the time variation amount ta that changes from the first clock time 32 at frequency f to the clock time 31 when the polarity of the output current ix switches, Equation (2) is obtained. Here, π represents the circle ratio.

[Equation 2]

$$ta = \frac{\theta a}{2\pi f} \cong \frac{\Delta I1}{2\sqrt{2}\, \pi f Irms} \quad [\text{sec}] \qquad (2)$$

When the output current ix has a negative polarity, the equation to obtain the phase variation amount θb from the first clock time 34, when the value (the effective value Irms) of the output current ix changes from outside the range into within the current range 30, to the current zero cross point 31 at which the polarity of the output current ix switches becomes an equation that the upper limit value ΔI1 in Equation (1) is replaced with the lower limit value −ΔI2. The equation to obtain the time variation amount tb from the first clock time 32 to the current zero cross point 31 at which the polarity of the output current ix switches becomes an equation that θa and the upper limit value ΔI1 in Equation (2) are replaced with θb and the lower limit value −ΔI2, respectively.

The clock time for switching the polarity of the correction voltage Δvx can be set using Equation (1) or Equation (2). First, a method for setting the clock time using Equation (2) is explained. That is, when the output current ix has a positive polarity, the first clock time 32 is set as a clock time t1, and the clock time t1+ta after the time variation amount ta that is obtained by Equation (2) based on this clock time t1 is set as a clock time t2 when the polarity of the correction voltage Δvx switches.

When the output current ix has a negative polarity, the first clock time 34 is set as a clock time t1, and the clock time t1+tb after the time variation amount tb is set as a clock time t2 when the polarity of the correction voltage Δvx switches. If the time for switching the polarity of the correction voltage Δvx is set with such a method, the clock time for switching the correction voltage Δvx can be accurately adjusted to the clock time of the zero cross point 31 when the polarity of the output current switches. Hereinafter, the first clock time is denoted using only the numeral 32 unless required to distinguish between the two first clock times 32 and 34.

Next, the method for setting the time for switching the polarity of the correction voltage Δvx using Equation (1) is explained. In this instance, the clock time t1 that is the first clock time 32 is converted into an arbitrary phase, and by performing to interpret a time variation as a phase variation repeatedly, a clock time at a phase, at which the phase variation amount θa obtained by Equation (1) can be confirmed, is set as the clock time for switching the polarity of the correction voltage Δvx. When using θb, the setting method is also similar.

For example, when the output current ix has a positive polarity, if the phase at the clock time t1, which is the first clock time 32 is, set to 0, the phase corresponding to the clock time t2 for switching the polarity of the correction voltage Δvx becomes the phase variation amount θa obtained by Equation (1). Consequently, let an arbitrary clock time between the clock time t1 and the clock time t2 be tx, the phase θx at the clock time tx is expressed as θx=2πf·(tx−t1) by using the frequency f; where, the frequency is assumed to be constant. By successively obtaining the phase θx at this arbitrary clock time tx, interpreting the time variation as the phase variation is performed repeatedly until the phase θx matches with the phase variation amount θa. If the phase θx matches with the phase variation amount θa, because it is possible to judge that the clock time t2 for switching the polarity of the correction voltage Δvx is reached, the clock time t2 when the phase θx matches with the phase variation amount θa is set as the clock time for switching the polarity of the correction voltage Δvx.

As described above, in the setting method using Equation (1), the clock time for switching the polarity of the correction voltage Δvx can be set with the similar accuracy to the setting method using Equation (2) without requiring a conversion calculation using Equation (2). Incidentally, the phase at the first clock time 32 can be set to not 0 but the same value as the phase of the voltage command vx*. In this instance, the time variation is interpreted as the phase variation of the output current ix or the voltage command vx*.

Basic methods for setting the clock time for switching the correction voltage Δvx are described above. Next, two examples of specific setting methods using Equation (2) are shown below. First, in the calculation of Equation (2), because the denominator includes the frequency f and the value (the effective value Irms) of the output current ix, a calculation using a division is necessary. For this reason, with the purpose of reducing the calculation amount in the control device 5a, a property table (see FIG. 4) of a correction coefficient K1 that changes in accordance with the frequency f and a property table (see FIG. 5) of a correction coefficient K2 that changes in accordance with the value (the effective value Irms) of the output current ix are made to record in the voltage-command correction unit 7a, and the clock time for switching the polarity of the output current ix is set based on the following Equation (3) in which both or one property tables are applied to Equation (2). Such a method can also be used.

[Equation 3]

$$ta \cong \frac{\Delta I1}{2\sqrt{2}\,\pi} K1 K2 \quad [\text{sec}] \tag{3}$$

FIG. 4 is an example of the property table of the correction coefficient K1 that changes in accordance with the frequency f. FIG. 5 is an example of the property table of the correction coefficient K2 that changes in accordance with the value (the effective value Irms) of the output current ix. From Equation (2) and Equation (3), because the relation between the frequency f and the correction coefficient K1 becomes K1=1/f, a curve of theoretical value shown in FIG. 4 is drawn. On the other hand, because the relation between the value (the effective value Irms) of the output current ix and the correction coefficient K2 becomes K2=1/"the value (the effective value Irms) of the output current ix", a curve of theoretical value shown in FIG. 5 is drawn. With the purpose of reducing the data amount to be recorded in the voltage-command correction unit 7a, by simplifying the property tables concerning the correction coefficients K1 and K2, the table can be replaced with approximate straight lines shown in FIG. 4 and FIG. 5, respectively.

Next, a method for simplifying the setting of the clock time for switching the polarity of the correction voltage Δvx is explained. This method does not use the value (the effective value Irms) of the output current ix for setting the clock time for switching the polarity of the correction voltage Δvx, but obtains the time variation amount ta from the frequency f.

For example, when the output current ix (three-phase currents iu, iv, iw) is divided into an excitation current id (d-axis current) necessary to generate a flux and a torque current iq (q-axis current) proportional to a load torque if the AC load 2a is a rotary machine based on the frequency f and the phases of three-phase currents iu, iv, iw for the current commands vu*, vv*, vw* using the publicly known vector calculation, the relation between the value (the effective value Irms) of the output current ix, and the excitation current id and the torque current iq is expressed by Equation (4).

[Equation 4]

$$Irms = \sqrt{\frac{1}{3}(id^2 + iq^2)} \quad [\text{A}] \tag{4}$$

When the AC load 2a is an induction machine, it is only necessary to set the excitation current id to a constant current value (letting this value be id0) at which the current flows when no-load operation is made. This constant current value id0 is a known value intrinsic to each rotary machine (induction machine). In this instance, because the excitation current id becomes the constant current value id0, the value (the effective value Irms) of the output current ix changes by the torque current iq that flows in accordance with the torque generated from the AC load (induction machine) 2a. However, by regarding, here, the variation of the torque current iq as a value to depend on the frequency f, a method for obtaining the time variation amount ta based on the frequency f is shown below without using the information on the currents obtained from the value (the effective value Irms) of the output current ix, such as the excitation current id and the torque current iq.

FIG. 6 is a diagram plotting the values of the time variation amount ta for the frequencies in two driving conditions at no-load (id=id0, iq=0) shown with the ● mark and at rating load (id=id0, iq=rating torque current (power running)) shown with the ○ mark in an induction machine with rating capacity: 3.7 kW and rating slip frequency: 3 Hz. When drawing FIG. 6, the upper limit value ΔI1 (the lower limit value −ΔI2) is set to 6% (a constant value) of the rating current, but not necessarily a constant value; when the upper limit value ΔI1 (the lower limit value −ΔI2) successively changes in accordance with the output state of the AC load (induction machine) 2a, it is only necessary to adjust the time variation amounts ta and tb in accordance with the upper limit value ΔI1 and the lower limit value—ΔI2, respectively.

At a rating load shown with the ○ mark in FIG. 6, the region where the frequency f is less than or equal to 3 Hz is also plotted, but in an actual induction machine, if a rating slip frequency is 3 Hz, the frequency f at the rating power running load becomes 3 Hz or more, so the rating power running load driving cannot be done in the range that the frequency f is less than or equal to the rating slip frequency (3 Hz). Therefore, in a range where the frequency f is less than or equal to the rating slip frequency (3 Hz), the load becomes small and the torque current iq becomes also smaller than the rating torque current. That is, at the load driving, because the load becomes smaller than the rating, the time variation amount ta becomes larger than the property at the rating load shown with the ○ mark in FIG. 6, and approaches to the property at no-load shown with the ● mark.

Accordingly, in a specific embodiment, an approximate broken line shown with the ■ mark in FIG. 6 is set so that errors from the respective properties at the no-load and at the rating load generally become small, the property table of the time variation amount ta that varies for the frequency f is memorized in the voltage-command correction unit 7a, and the time variation amount ta is obtained from the property table in accordance with the frequency f.

In this way, the time variation amount ta can be obtained using the frequency f without using the information on the currents obtained from the value (the effective value Irms) of the output current ix, such as the excitation current id and the torque current iq, thereby enabling to set the clock time for switching the polarity of the correction voltage Δvx.

Although the broken line shown with the ■ mark in FIG. 6 is set so that errors from the respective properties at the no-load shown with the ● mark and at the rating load shown with the ○ mark become small, the criterion of obtaining the broken line is not necessary at the no-load or at the rating load, but the criterion of obtaining the broken line can be changed in accordance with the load range. Moreover, the broken line can be replaced with an approximate curved line by increasing the data points in accordance with the memory capacity of the voltage-command correction unit 7a. Furthermore, When setting the clock time for switching the polarity of the correction voltage Δvx by the phase variation amount θa using Equation (1), it is only necessary to convert the time variation amount ta into the phase variation amount ea using the relation θa=2πfta.

Furthermore, calculation amount performed in the control device 5a can be reduced by obtaining the time variation amount ta using the frequency f without using the value (the effective value Irms) of the output current ix, such as the excitation current id and the torque current iq, thereby enabling to obtain an advantageous effect to reduce the load on a microcomputer housed in the control device 5a and other computers. These are the methods for setting the clock time for switching the polarity of the correction voltage Δvx in ST16. After setting the clock time, each processing of ST21 to ST23 is executed to perform the necessary update processing, and the system control proceeds to the processing at the next sample timing.

On the other hand, in ST14, when the value of the output current ix detected at the sample timing is judged to keep the state in which the value enters within the current range 30 at the sample timing (ST14: No), because the clock time for switching the polarity of the correction voltage Δvx is already set, the voltage-command correction unit 7a judges whether the clock time for switching the polarity of the correction voltage Δvx has passed (ST17).

As a result, if the clock time for switching the polarity of the correction voltage Δvx has not passed (ST17: No), because the polarity of the correction voltage Δvx is not switched, the polarity of the correction voltage Δvx is matched to the same polarity as the polarity before the first clock time 32. That is, the polarity of the correction voltage Δvx at this time is matched to the polarity recorded in the polarity setting signal signx (ST20). After finishing this step, each processing of ST21 to ST23 is executed to perform the necessary update processing, and the system control proceeds to the processing at the next sample timing.

In ST17 at which a period from the first clock time 32 to just before the clock time for switching the polarity of the correction time Δvx has passed, if the clock time for switching the polarity of the correction time Δvx is judged to have passed (ST17: Yes), the voltage-command correction unit 7a executes each processing of ST18 and ST19. The processing order of ST18 and ST19 can be replaced; in ST18, as processing in a period until the value (the effective value Irms) of the output current ix goes out of the current range 30, the polarity of the correction voltage Δvx is set to a polarity reversed with respect to the polarity recorded in the polarity setting signal signx in ST15, and in ST19, the previously set clock time for switching the polarity of the correction time Δvx is reset. After finishing this step, each processing of ST21 to ST23 is executed to perform the necessary update processing, and the system control proceeds to the processing at the next sample timing.

In ST21 to ST23, the following processing is performed. That is, in ST21, an amplitude |Δvx| of the correction voltage Δvx is set. Magnitude (absolute value) of an error that occurs caused by the dead time between the AC voltage command vx* and the output voltage vx from the electric-power conversion unit 3 is theoretically obtained by the product of the carrier frequency [Hz], the DC link voltage [V] of the electric-power conversion unit 3, and the dead time [sec]. By taking this into account, let a value obtained from the product of these three values be |Verr|, it is only necessary to set the amplitude |Δvx| of the correction voltage based on the value |Verr|.

In ST22, the correction voltage Δvx of the voltage amplitude |Δvx| having the polarity set to the polarity setting signal signx is added to the AC voltage command vx* to obtain the AC voltage command vx. In ST23, the AC voltage command vx after the addition is output to the electric-power conversion unit 3.

The voltage-command correction unit 7a successively performs a series of processing of ST10 to ST23 explained above for each phase of u, v, and w, and outputs the AC voltage command vu, vv, vw** in which the voltage error caused by the dead time is corrected to the electric-power conversion unit 3.

Next, a situation in which the voltage-command correction unit 7a switches the polarity of the correction voltage is specifically explained with reference to FIG. 7. In FIG. 7, a relation of the one phase output current ix received from the current detection unit 4 in ST10, the one phase AC voltage command vx* output from the voltage-command calculation unit 6a, and the polarity of the correction voltage determined by the voltage-command correction unit 7a with the aforementioned procedure is shown. A certain phase difference exists between the output voltage ix and the AC voltage command vx*.

The current range 30 including 0 level is set for the output current ix in ST11; among the clock times 35, 32, 36, 34, and 37 at which the values of the output voltage ix coincide with either of the upper limit value ΔI1 and the lower limit value −ΔI2, the clock times 35 and 37 are clock times when the values of the output voltage ix go out of the upper side of the current range 30 exceeding the upper limit value ΔI1, and the clock time 36 is a clock time when the value of the output voltage ix goes out of the lower side of the current range 30 exceeding the lower limit value −ΔI2. The clock time 32 is the first clock time when the value of the output voltage ix enters inside the current range 30 from the outside of the upper limit of the current range 30, and the clock time 34 is the first clock time when the value of the output voltage ix enters inside the current range 30 from the outside of the lower limit of the current range 30.

The period (1) is a period during which the value of the output voltage ix is located outside of the upper limit value ΔI1 and the lower limit value −ΔI2 of the current range 30. This period (1) is specified by the clock times 35, 32, 36, and 34 judged based on the upper limit value ΔI1 and the lower limit value −ΔI2 of the current range 30 set in ST11 and the value of the output voltage ix used in ST12 at the present sampling, and in ST 13, the polarity of the correction voltage Δvx in this period (1) is set to the same polarity as the value of the output current ix used in ST12 at the present sampling. The period (2) is a period for the value of the output current ix at the present sampling from the first clock time 32 until reaching just before a clock time 38 for switching the polarity of the correction voltage Δvx; when the clock time 38 for switching the polarity of the correction voltage Δvx is reached, the polarity of the correction voltage Δvx is switched. In this period (2), each processing of ST12, ST14, ST15, and ST16 is performed. That is, because the value of the output current ix at one sampling before is judged to fall inside the current range 30 in ST12, but the value of the output current ix at the present sampling is judged not to fall inside the current range 30 in ST14, the polarity of the correction voltage Δvx in this period (2) is set to the same polarity as the value of the output current ix at the present sampling used in ST12 just as in the period (1) (ST15). Concurrently, the clock time 38 for switching the polarity of the correction voltage Δvx is set to a clock time very near to the zero cross point based on the first clock time 32, the frequency f, and (not necessarily required, the value of output current ix at the present sampling) (ST16). In Patent Documents 1 and 2 shown above and other documents, because this period (2) did not exist, the accuracy of the error correction was not good.

The period (3) is a period for the value of the output current ix at the present sampling from the current zero cross point 31 after the clock time 38 when the polarity of the correction voltage Δvx was switched until the clock times 35, 36, and 37 when the value goes out the current range 30. In this period (3), when the passing of the period (2) is confirmed in ST17, the polarity of the correction voltage Δvx is set to a polarity reversed with respect to the polarity in the period (1) (ST18). Concurrently, the previously determined clock time 38 when the polarity of the correction voltage Δvx was switched is reset (ST19).

As described above, according to the first embodiment, the voltage-command correction unit 7a provided between the electric-power conversion unit 3 and the voltage-command calculation unit 6a that calculates and outputs the AC voltage command to the electric-power conversion unit 3, for the purpose of correcting an error between the output voltage from the electric-power conversion unit 3 and the voltage command that occurs caused by the dead time voltage given to the power device elements of the upper and lower arms that configure the electric-power conversion unit 3, provides a predetermined current range including the zero level for the detected output voltage, and, at a first clock time when the value of the output current enters from the outside to the inside of the current range, sets the timing (clock time or phase) of the zero cross point of the output current as the clock time for switching the polarity of the correction voltage that corrects the AC voltage command based on the first clock time and the frequency f, that is, performs the switching of the polarity of the correction voltage that corrects the voltage error caused by the dead time at the zero cross point of the output current, and performs the correction of the AC voltage command using the correction voltage with the same polarity as the polarity of the output current around the zero cross point of the output current, thereby enabling accurately to reduce the voltage error caused by the dead time near the zero cross point of the output current. With this, when a rotary machine is connected to the electric power converter, because the rotational irregularity near the zero cross point of the output current is reduced, an unprecedented prominent effect for enhancing the driving performance will be achieved.

Moreover, if the clock time for switching the correction voltage is made to add also the output current, the timing of the zero cross point of the output current can be directly obtained, thereby enabling to obtain the zero cross point of the output current more accurately and attaining an advantageous effect capable of further reducing the voltage error near the zero cross point of the output current.

Furthermore, the current range is set as a predetermined current range including the zero level for the detected output current, that is, set as the current range sandwiched between the upper limit value in the positive polarity side and the lower limit value in the negative polarity side from the zero level of the detected output current, thereby obtaining an advantageous effect capable of correctly setting the polarity of the correction current without being affected by a chattering phenomenon occurring near the zero cross point of the current.

Second Embodiment

Figure 8:
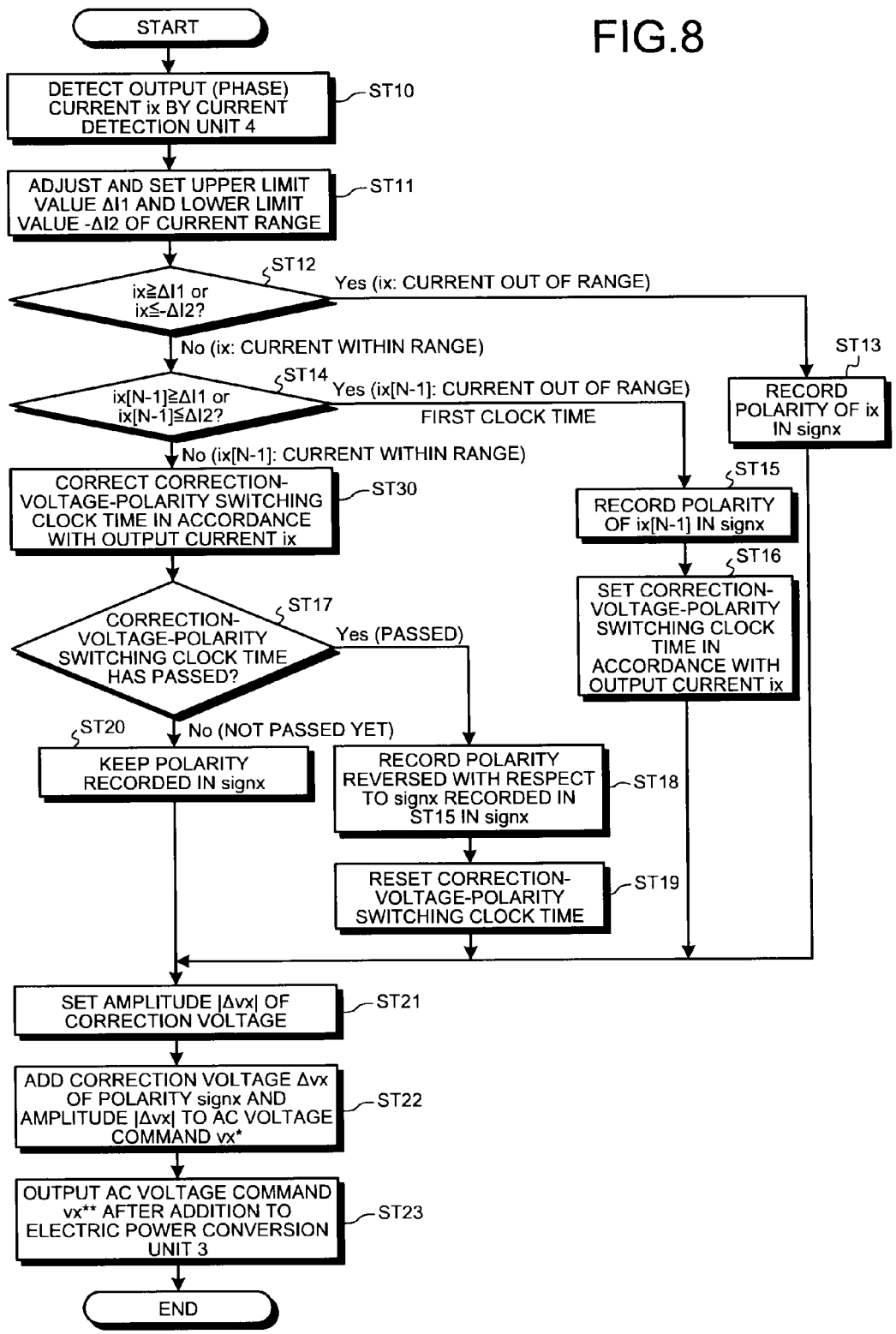
FIG. 8 is a flowchart illustrating a procedure of a correction operation by a voltage-command correction unit included in an electric power converter according to a second embodiment of the present invention.

FIG. 8 is a flowchart illustrating a procedure of the correction operation by a voltage-command correction unit provided in an electric power converter according to a second embodiment of the present invention. In FIG. 8, the same letter or numeral is put for the same or similar processing procedure as the processing procedure shown in FIG. 2. In what follows, components related to the second embodiment will be mainly explained.

As shown in FIG. 8, in the processing procedure shown in FIG. 2, the voltage-command correction unit provided in the electric power converter according to the second embodiment, in transition processes from ST14 to ST17, if the judgment at ST14 is negative (No), performs the processing of ST30, and then proceeds to ST17.

In ST30, by explaining with reference to FIG. 7, in the time period (2) from the first clock time 32 to the correction-voltage-polarity switching clock time 38, the correction processing of the correction-voltage-polarity switching clock time 38 is performed in accordance with the value of the output current ix. Any one of the effective value, the amplitude value, and the instantaneous value can be used for the value of the output current ix. Furthermore, the current command ix* can be used in place of the output current ix.

When the output current ix is not constant, and the value (the effective value Irms) changes, the value becomes a function of t, that is, Irms=Irms(t).

Accordingly, in the second embodiment, in this situation, by using Equation (5) instead of Equation (2), the time variation amount ta of the value (the effective value Irms) of the output current ix from the first clock time 32 to the clock time 38 for switching the polarity of the correction voltage Δvx is calculated by successively integrating the variation of the value (the effective value Irms) of the output current ix under the constant frequency f, and the clock time 38 for switching the polarity of the correction voltage Δvx is corrected based on the calculation result; where, the clock time tx shown in Equation (5) is an arbitrary clock time that exists from the clock time t1 (the first clock time) to the clock time t2 (the correction-voltage-polarity switching clock time).

[Equation 5]

$$ta = \frac{\Delta I 1 tx}{2\sqrt{2}\,\pi f \int_0^{tx} Irms(t)\,dt} \; [\sec] \qquad (5)$$

As described above, according to the second embodiment, before switching the polarity of the correction voltage, the clock time for switching the polarity of the correction voltage is successively corrected in accordance with the value of the detected output current, and the polarity of the correction voltage is switched based on the corrected clock time, thereby enabling to switch the polarity of the correction voltage more accurately even when the output current fluctuates due to a load fluctuation and a speed fluctuation and attaining an advantageous effect capable of further reducing the voltage error near the zero cross point of the output current.

Third Embodiment

Figure 9:
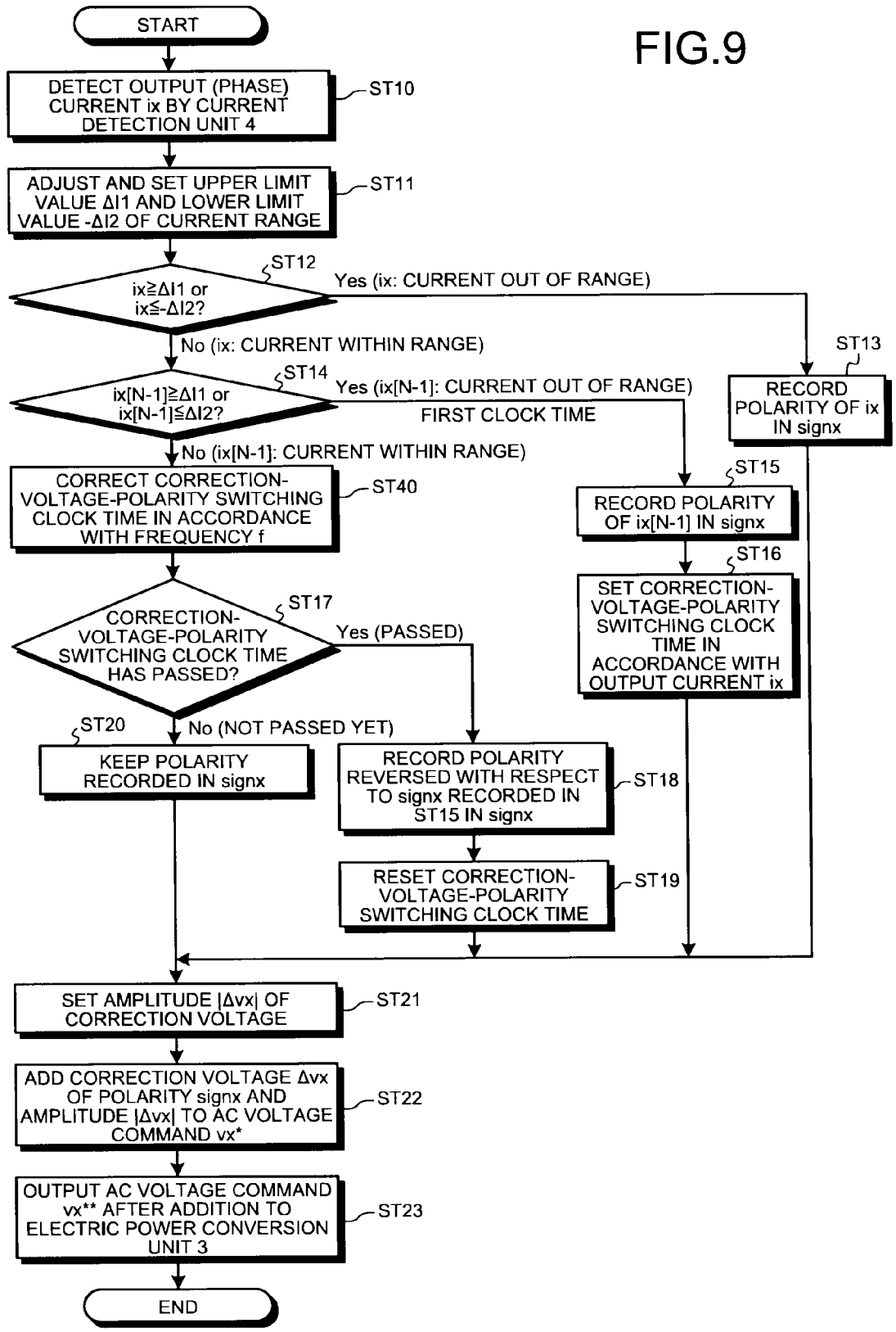
FIG. 9 is a flowchart illustrating a procedure of a correction operation by a voltage-command correction unit included in an electric power converter according to a third embodiment of the present invention.

FIG. 9 is a flowchart illustrating a procedure of the correction operation by a voltage-command correction unit provided in an electric power converter according to a third embodiment of the present invention. In FIG. 9, the same letter or numeral is put for the same or similar processing procedure as the processing procedure shown in FIG. 2. In what follows, components related to the third embodiment will be mainly explained.

As shown in FIG. 9, in the processing procedure shown in FIG. 2, the voltage-command correction unit provided in the electric power converter according to the third embodiment, in transition processes from ST14 to ST17, if the judgment at ST14 is negative (No), performs the processing of ST40, and then proceeds to ST17.

In ST40, by explaining with reference to FIG. 7, in the time period (2) from the first clock time 32 to the correction-voltage-polarity switching clock time 38, the correction processing of the correction-voltage-polarity switching clock time 38 is performed in accordance with the frequency f at every sample timing. Because the frequency f is the same as the frequencies of the output current ix, the current command ix*, the output voltage vx, and the output command vx* in a steady state, the correction can be performed using any one of these frequencies.

If the frequency is not constant, and the value of the frequency changes, the frequency is a function of the time t. That is, the frequency is f=f(t). In the third embodiment, in this situation, by using Equation (6) instead of Equation (2), the time variation amount ta of the value (the effective value Irms) of the output current ix from the first clock time 32 until reaching the clock time 38 for switching the polarity of the correction voltage Δvx, is calculated by successively integrating the variation of the frequency f at every sample timing by assuming that the value (the effective value Irms) of the output current ix is constant, and the clock time 38 for switching the polarity of the correction voltage Δvx is corrected based on the calculation result; where, the clock time tx shown in Equation (6) is an arbitrary clock time that exists from the clock time t1 (the first clock time) to the clock time t2 (the correction-voltage-polarity switching clock time).

[Equation 6]

$$ta = \frac{\Delta I 1 tx}{2\sqrt{2}\,\pi Irms \int_0^{tx} f(t)\,dt} \; [\sec] \qquad (6)$$

As described above, according to the third embodiment, before switching the polarity of the correction voltage, the clock time for switching the polarity of the correction voltage is successively corrected in accordance with the variation of the frequency, and the polarity of the correction voltage is switched based on the corrected clock time, thereby enabling to switch the polarity of the correction voltage more accurately even when the frequency fluctuates due to a load fluctuation and a speed fluctuation and attaining an advantageous effect capable of further reducing the voltage error near the zero cross point of the output current.

Fourth Embodiment

Figure 10:
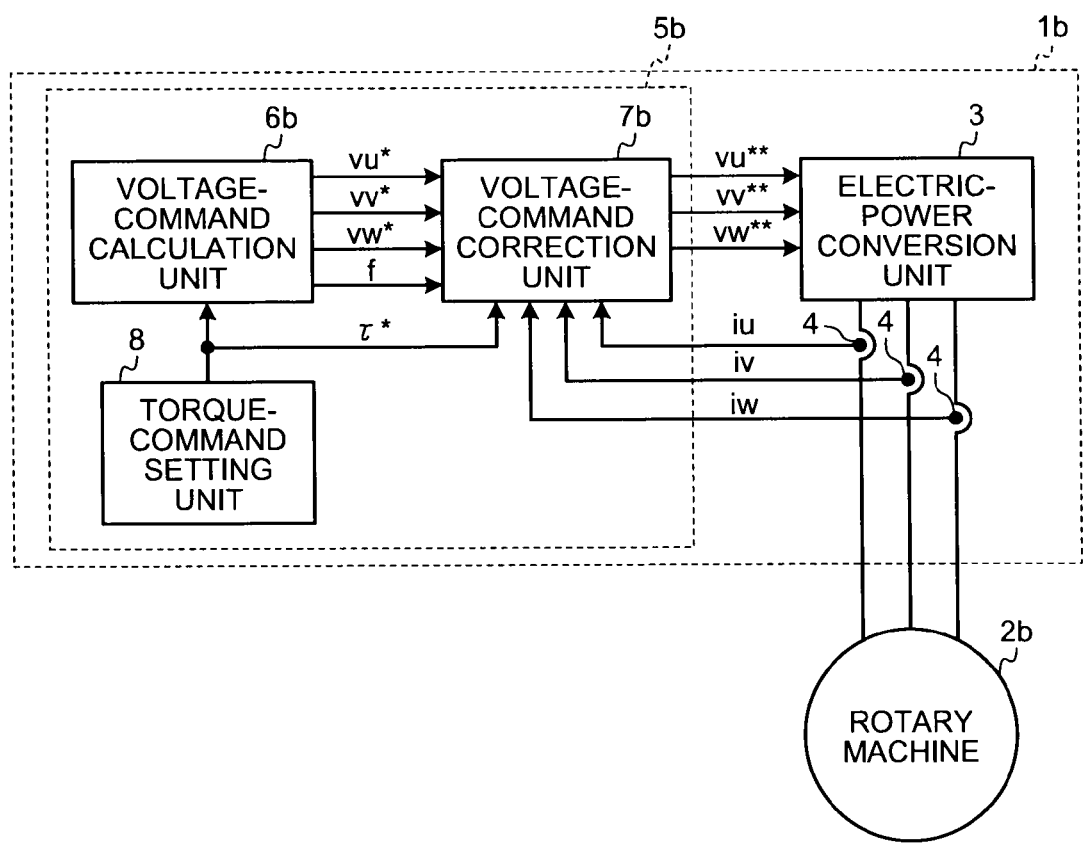
FIG. 10 is a block diagram illustrating a configuration of an electric power converter according to a fourth embodiment of the present invention.

FIG. 10 is a block diagram illustrating a configuration of an electric power converter according to a fourth embodiment of the present invention. In FIG. 10, the same letter or numeral is put for the same or similar component as the component shown in FIG. 1 (first embodiment). In what follows, components related to the fourth embodiment will be mainly explained.

As shown in FIG. 10, an electric power converter 1b according to the fourth embodiment includes a rotary machine 2b as an example as a substitute for the AC load 2a and a control device 5b as a substitute for the control device 5a in the configuration shown in FIG. 1 (first embodiment). The control device 5b includes a voltage-command calculation unit 6b and a torque command setting unit 8 that gives a torque command τ* to a voltage-command correction unit 7b, with a letter of the unit name changed.

In the fourth embodiment, the voltage-command correction unit 7b performs both or either one of the processing (1) for setting the clock time 38 for switching the polarity of the correction voltage Δvx based on the first clock time 32, the frequency f, and the torque command τ* as the processing corresponding to ST 16 in FIG. 2, and the processing (2) for correcting the clock time 38 for switching the polarity of the correction voltage Δvx set using the method shown in the first embodiment (FIG. 2) in accordance with the torque command τ* as the processing corresponding to ST30 in FIG. 8 or ST40 in FIG. 9. In what follows, an instance for performing both processing will be explained.

First, the processing (1) for setting the clock time 38 for switching the polarity of the correction voltage Δvx based on the first clock time 32, the frequency f, and the torque command τ* is explained. In the first embodiment, the relation between the value (the effective value Irms) of the output current ix, and the excitation current id and the torque current iq is expressed by Equation (4); while the relation between the torque current iq and the load torque τ of the rotary machine 2b is expressed by Equation (7), where, Kt shown in Equation (7) is a torque constant intrinsic to the rotary machine 2b.

[Equation 7]

$$\tau = Kt \cdot iq \, [N \cdot m] \qquad (7)$$

If the rotary machine 2b is an induction machine, the excitation current id is set to a constant value intrinsic to each rotary machine, as explained in the first embodiment; if the rotary machine 2b is a permanent magnet synchronous machine, the excitation current id is set to 0, and the excitation current id is controlled to keep a constant value using the publicly known maximum efficiency control method or other similar methods. In the electric power converter 1b shown in FIG. 10, if the electric power converter 1b is controlled so that the load torque τ of the rotary machine 2b agrees with the torque command τ*, the relation of the following Equation (8) is obtained from Equations (4) and (7).

[Equation 8]

$$Irms \cong \sqrt{\frac{1}{3}\left\{id^2 + \left(\frac{\tau^*}{Kt}\right)^2\right\}} \quad [A] \tag{8}$$

In Equation (8), because a variable is only the torque command τ*, the value (the effective value Irms) of the output current ix changes in accordance with the torque command τ*. For this reason, even if the clock time 38 for switching the polarity of the correction voltage Δvx is set in accordance with the torque command τ*, the switching clock time 38 can be set by obtaining the zero cross point 31 of the output current with the similar accuracy to the instance when setting the switching clock time 38 in accordance with the output current ix explained in ST16 in FIG. 2, thereby enabling accurately to reduce the voltage error near the zero cross point of the output current.

In the processing (1), a method for setting the clock time 38 for switching the polarity of the correction voltage Δvx in accordance with the torque command τ* is explained; otherwise, for example, the load torque τ of the rotary machine 2b is detected in some way and the clock time 38 is adjusted in accordance with the load torque τ, or the torque current iq is obtained based on Equation (4) or Equation (7) and the clock time 38 is set in accordance with the torque current iq; such methods can be used.

Next, the processing (2) for correcting the clock time 38 for switching the polarity of the correction voltage Δvx set using the method shown in the first embodiment (FIG. 2) in accordance with the torque command τ* is explained. Because the value (the effective value Irms) of the output current ix changes in accordance with the torque command τ* with a relationship shown in Equation (8), the clock time for switching the polarity of the correction voltage Δvx set using a method according to the fourth embodiment explained in the processing (1) is corrected in accordance with the torque command τ* if the judgment in ST14 is negative (No), and then, the system control proceeds to the processing of ST17.

With this method, before switching the polarity of the correction voltage, the clock time for switching the polarity of the correction voltage Δvx is successively corrected in accordance with the torque command τ*, and the polarity of the correction voltage is switched based on the corrected clock time, thereby enabling to switch the polarity of the correction voltage more accurately just as in the second and third embodiments even when the output current fluctuates due to a load fluctuation and a speed fluctuation and attaining an advantageous effect capable of further reducing the voltage error near the zero cross point of the output current.

In the processing (2), a method for setting the clock time for switching the polarity of the correction voltage Δvx in accordance with the torque command τ* is explained; otherwise, for example, the load torque τ of the rotary machine 2b is detected in some way and the clock time is corrected in accordance with the load torque τ, or the torque current iq is obtained based on Equation (4) or Equation (7) and the clock time is corrected in accordance with the torque current iq; such methods can be used.

Figure 11:
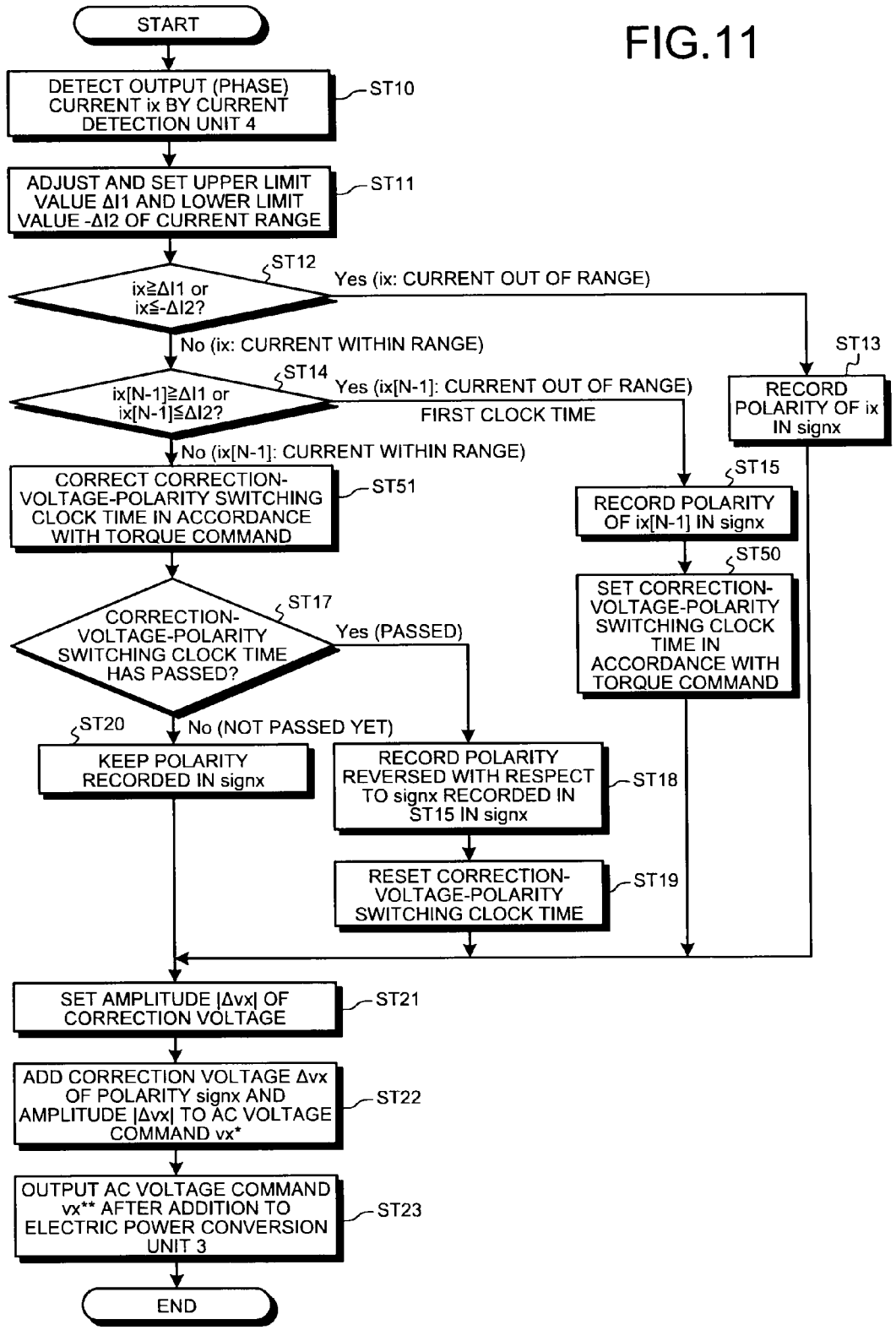
FIG. 11 is a flowchart illustrating a procedure of a correction operation by a voltage-command correction unit shown in FIG. 10.

FIG. 11 is a flowchart illustrating a procedure of the correction operation by the voltage-command correction unit 7b according to the third embodiment incorporating both the processing (1) and the processing (2) explained above in FIG. 2. In FIG. 11, in ST50 in place of ST16, the clock time 38 for switching the polarity of the correction voltage Δvx in accordance with the torque command τ* is set using the method explained in the processing (1). In addition, in ST51 provided between ST14 and ST17, the clock time 38 for switching the polarity of the correction voltage Δvx is corrected in accordance with the torque command τ* using the method explained in the processing (2).

As explained above, according to the fourth embodiment, the zero cross point 31 of the output current can be obtained with the same accuracy as in the first embodiment, thereby enabling accurately to reduce the voltage error near the zero cross point of the output current. Moreover, the polarity of the correction voltage can be switched more accurately just as in the second and third embodiments, thereby obtaining an advantageous effect capable of further reducing the voltage error near the zero cross point of the output current.

Fifth Embodiment

Figure 12:
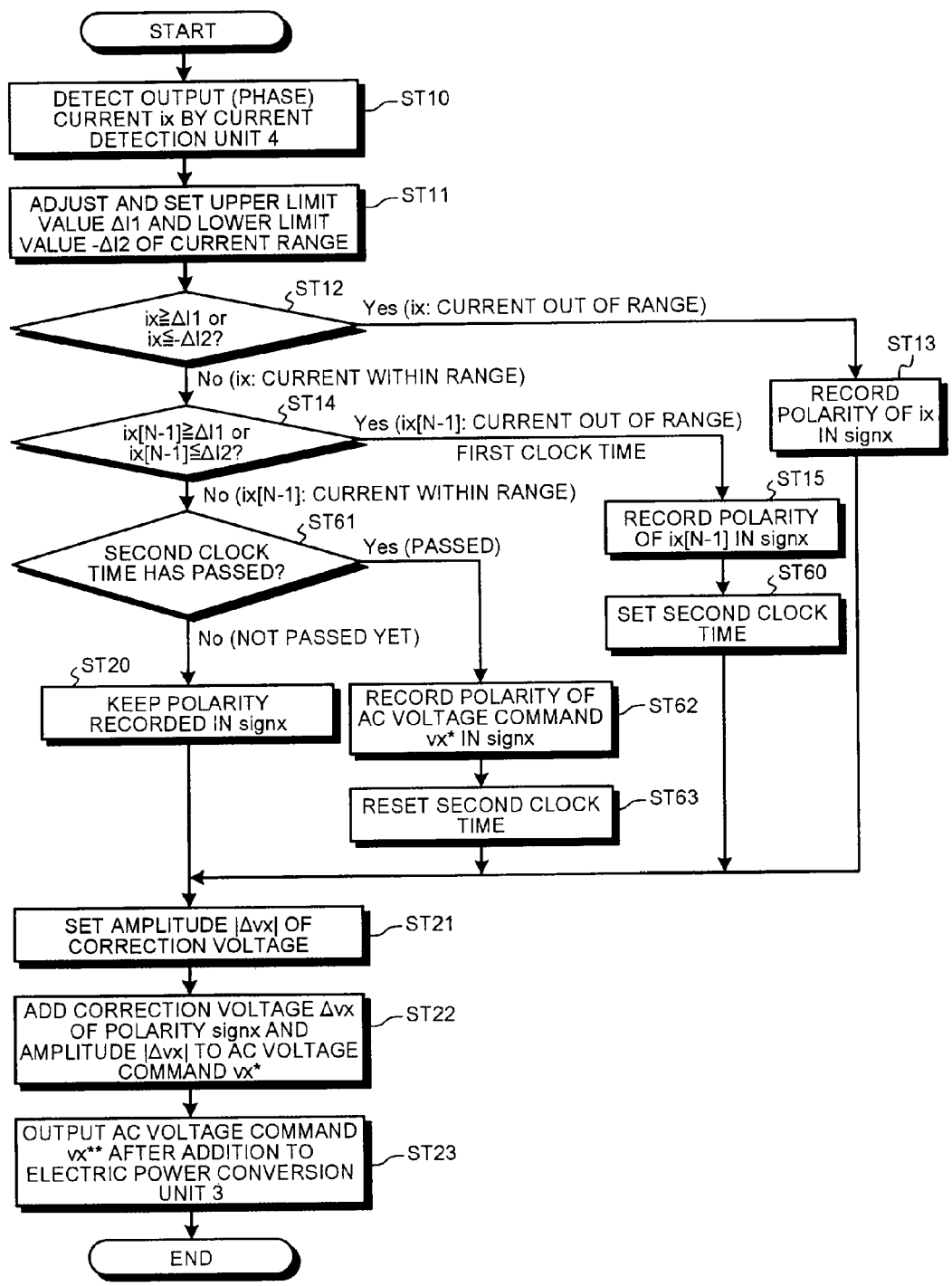
FIG. 12 is a flowchart illustrating a procedure of a correction operation by a voltage-command correction unit included in an electric power converter according to a fifth embodiment of the present invention.

FIG. 12 is a flowchart illustrating a procedure of the correction operation by a voltage-command correction unit provided in an electric power converter according to a fifth embodiment of the present invention. In FIG. 12, the same letter or numeral is put for the same or similar processing procedure as the processing procedure shown in FIG. 2. In what follows, components related to the fifth embodiment will be mainly explained.

The electric power converter according to the fifth embodiment includes similar components to the electric power converter 1a shown in FIG. 1 (the first embodiment) or the electric power converter 1b shown in FIG. 10 (the fourth embodiment), but a voltage-command correction unit provided in the electric power converter according to the fifth embodiment performs slightly different operations from the voltage-command correction units 7a and 7b. That is, in FIG. 12, the voltage-command correction unit provided in the electric power converter according to the fifth embodiment performs the processing of ST60 in place of the processing of ST16 (ST50), the processing of ST61 in place of the processing of ST17, the processing of ST62 in place of the processing of ST18, and the processing of ST63 in place of the processing of ST19 in the processing procedure shown in FIG. 2 (FIG. 11).

In ST60, a second clock time is set using the same setting method as the method for setting the clock time for switching the polarity of the correction voltage Δvx to correct the AC voltage command vx* explained in the first embodiment. In ST61, whether the second clock time has been passed is judged. In ST62, the polarity of the AC voltage command vx* is recorded in the polarity setting signal signx. In ST63, the second clock time is reset.

That is, the voltage-command correction unit according to the fifth embodiment, upon judging that the value of the output current ix detected using the sample timing has entered from outside the range into within the current range 30 at the sample timing for the first time (ST14: Yes), performs each processing of ST15 and ST60, and proceeds to ST21. Although the processing order of ST15 and ST60 can be replaced, in ST15, the polarity of the detected value ix[N−1] of the output current ix before one sampling is recorded in the polarity setting signal signx, and in ST60, at the first clock times (numerals 32 and 34 shown in FIG. 3) when the output current ix entered from outside the range into within the current range 30, the second clock time is set using the same method as the clock time (numeral 38 shown in FIG. 7) for switching the polarity of the correction voltage Δvx to correct the AC voltage command vx* explained in the first embodiment.

In addition, in ST14, the voltage-command correction unit according to the fifth embodiment, upon judging that the value of the output current ix detected using the sample timing keeps a state within the current range 30 (ST14: No), judges whether the second clock time has passed because the second clock time is set as described above (ST61).

As a result, if the second clock time has not passed (ST61: No), switching the polarity of the correction voltage Δvx is not performed, and the polarity of the correction voltage Δvx is matched to the same polarity of the correction voltage Δvx as the polarity before the first clock time 32. That is, in ST15, the polarity of the correction voltage Δvx is made to match with the polarity recorded in the polarity setting signal signx (ST20).

In ST61 when a period after the first clock time 32 until just before the second clock time has passed, if the second clock time is judged to have passed (ST61: Yes), the voltage-command correction unit according to the fifth embodiment records the polarity of the correction voltage Δvx in the polarity setting signal signx as the processing in a period until the value (the effective value Irms) of the output current goes out of the current range 30 (ST62). That is, the polarity of the correction voltage Δvx is matched to the polarity of the AC voltage command vx*. Then, the second clock time previously set is reset (ST63).

Figure 13:
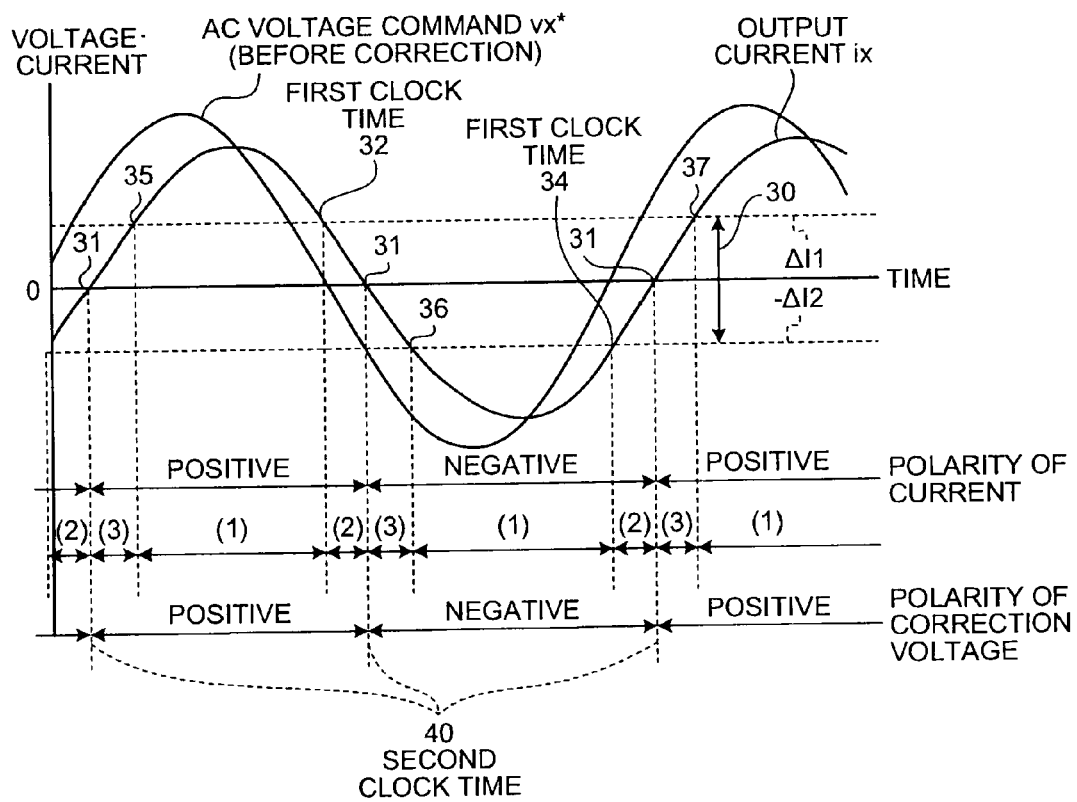
FIG. 13 is a time chart illustrating collectively a correction operation of a voltage error caused by a dead time realized by the correction processing shown in FIG. 12.

Next, FIG. 13 is a time chart collectively illustrating the correction operation of the voltage error caused by the dead time realized by the correction processing shown in FIG. 12. In FIG. 13, the similar contents to those shown in FIG. 7 are shown. Different points are that the correction-voltage-polarity switching clock time 38 shown in FIG. 7 becomes a second clock time 40 in FIG. 13; and the polarity of the correction voltage Δvx is a polarity reversed with respect to the polarity set in the period (1) in FIG. 9, while the polarity of the correction voltage Δvx is the same as the polarity of the AC voltage command vx* in FIG. 13.

In the processing procedure according to the fifth embodiment, when judging whether the value of the output current ix reaches the second clock time 40, the polarity of the correction voltage Δvx is compared with the polarity of the AC voltage command vx* at the second clock time 40. As a result, if the polarity of the AC voltage command vx* is reversed, the polarity of the correction voltage Δvx is switched when passing the second clock time 40. On the other hand, if the polarity of the AC voltage command vx* is the same as the polarity of the correction voltage Δvx, the polarity of the correction voltage Δvx is switched when the polarity of the AC voltage command vx* is switched. For this reason, the operation to switch the polarity of the correction voltage Δvx is delayed from the second clock time 40. With this, when the phase difference between the output current ix and the AC voltage command vx* (output voltage vx) is large, the polarity of the correction voltage Δvx can be switched near the zero cross point of the output current ix just as in the first and fourth embodiments.

Therefore, according to the fifth embodiment, when the phase difference between the output current and the AC voltage command (output voltage) is large, the voltage error near the zero cross point of the output current can be reduced, thereby enabling to reduce the rotational irregularity when a rotary machine is connected and attaining an advantageous effect to enhance the driving performance.

Sixth Embodiment

Figure 14:
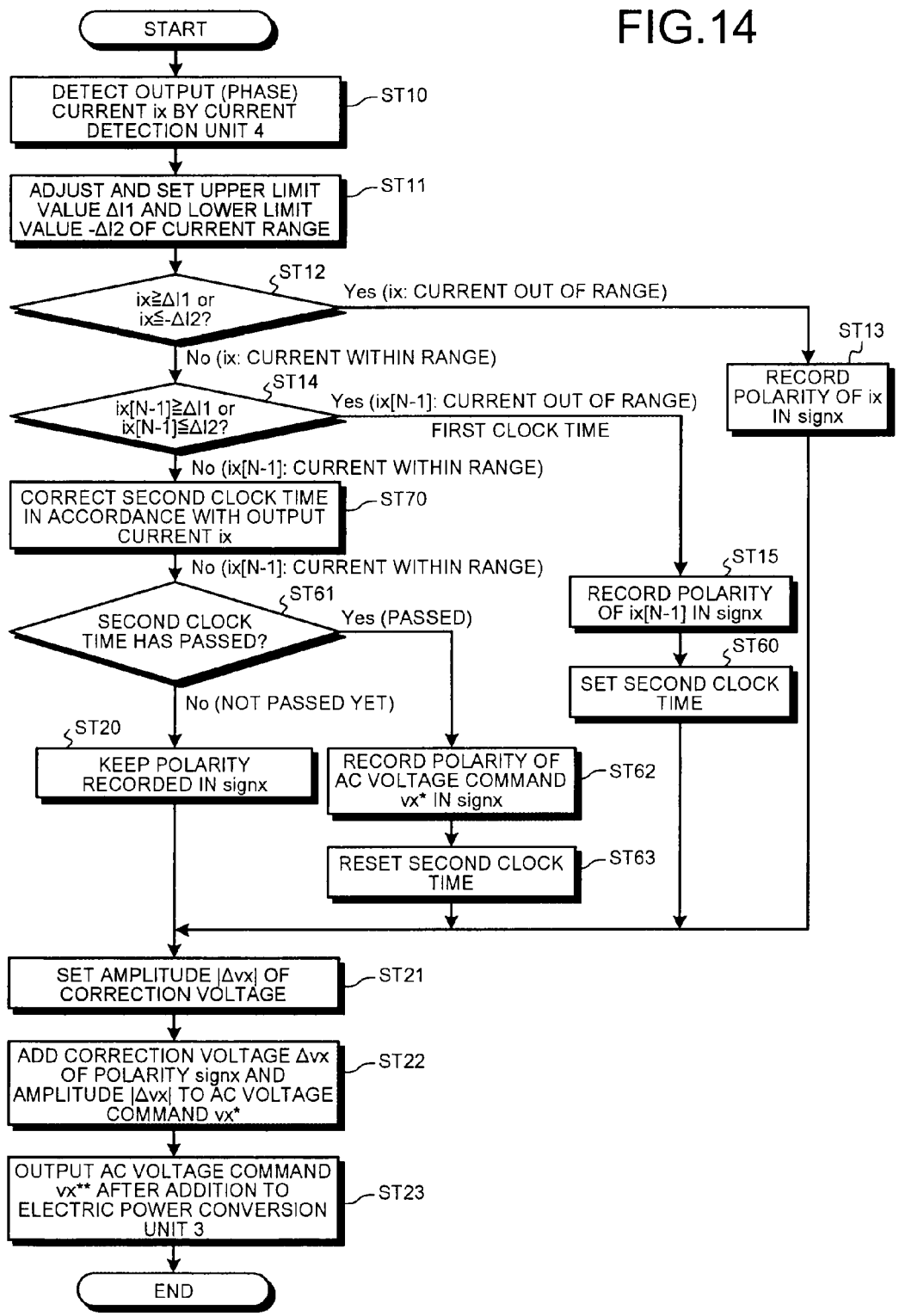
FIG. 14 is a flowchart illustrating a procedure of a correction operation by a voltage-command correction unit included in an electric power converter according to a sixth embodiment of the present invention.

FIG. 14 is a flowchart illustrating a procedure of the correction operation by a voltage-command correction unit provided in an electric power converter according to a sixth embodiment of the present invention. In FIG. 14, the same letter or numeral is put for the same or similar processing procedure as the processing procedure shown in FIG. 12. In what follows, components related to the sixth embodiment will be mainly explained.

As shown in FIG. 14, in the processing procedure shown in FIG. 12, the voltage-command correction unit provided in the electric power converter according to the sixth embodiment, in transition processes from ST14 to ST61, if the judgment at ST14 is negative (No), performs the processing of ST70, and then proceeds to ST61.

In ST70, by explaining with reference to FIG. 13, in the time period (2) from the first clock time 32 to the second clock time 40, the correction processing of the second clock time 40 is performed in accordance with the value of the output current ix. Any one of the effective value, the amplitude value, and the instantaneous value can be used for the value of the output current ix. Furthermore, the current command ix* can be used in place of the output current ix.

The correction of the second clock time 40 in accordance with the value of the output current ix can be performed with the same idea as the correction method for the correction voltage switching clock time explained in ST30 in FIG. 8. That is, when the output current is not constant and the value (the effective value Irms) changes, by using Equation (5) as well, the time variation amount ta of the value (the effective value Irms) of the output current ix from the first clock time 32 until reaching the second clock time 40, is calculated by successively integrating the variation of the value (the effective value Irms) of the output current ix under the constant frequency f, and the second clock time 40 is corrected based on the calculation result; where, the clock time tx shown in Equation (5) is an arbitrary clock time that exists from the clock time t1 (the first clock time) to the clock time t2 (the second clock time).

As described above, according to the sixth embodiment, before switching the polarity of the correction voltage, the second clock time is successively corrected in accordance with the value of the detected current, and the polarity of the correction voltage is switched based on the corrected second clock time, thereby enabling to switch the polarity of the correction voltage more accurately even when the output current fluctuates due to a load fluctuation and a speed fluctuation and attaining an advantageous effect capable of further reducing the voltage error near the zero cross point of the output current.

Seventh Embodiment

Figure 15:
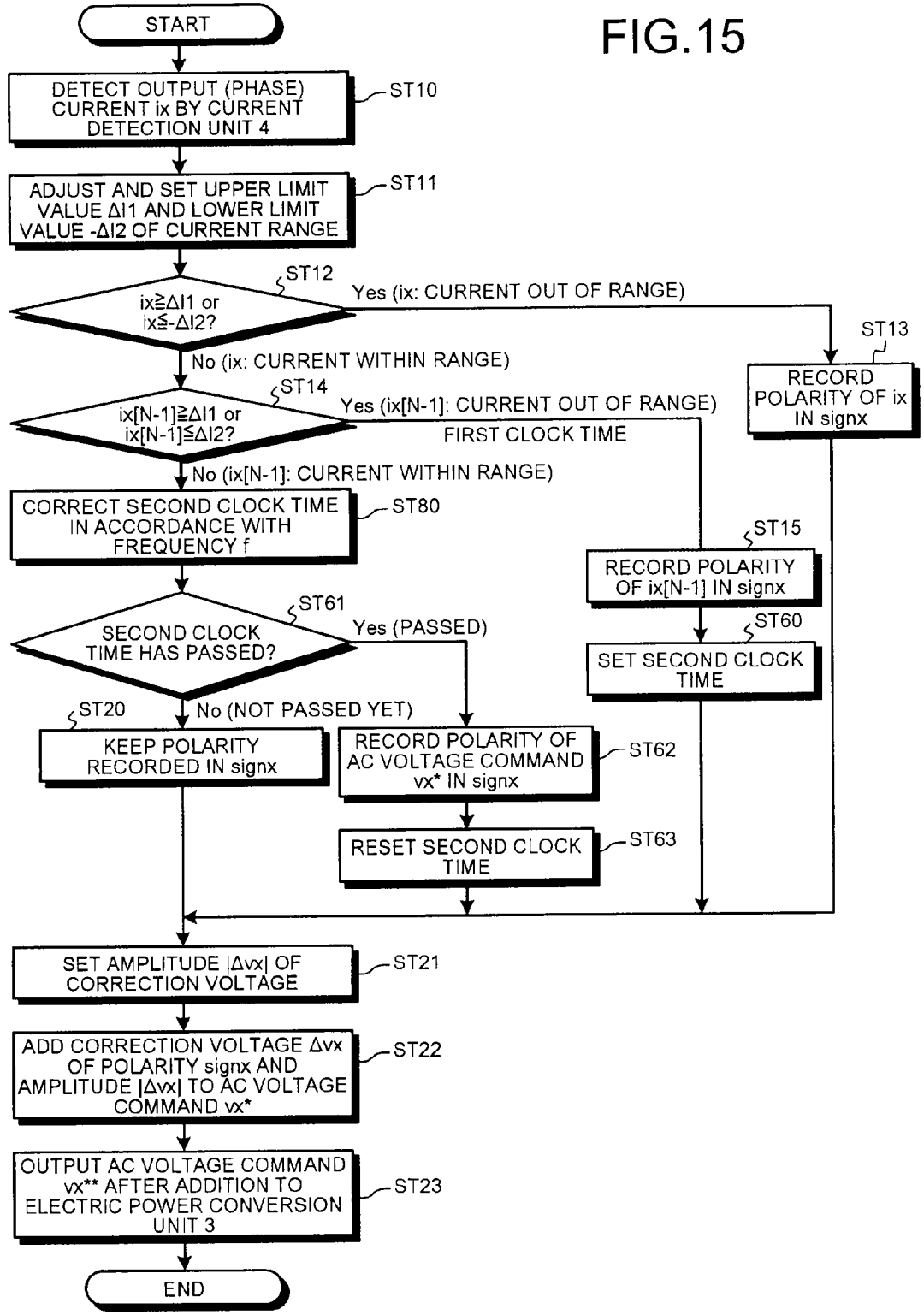
FIG. 15 is a flowchart illustrating a procedure of a correction operation by a voltage-command correction unit included in an electric power converter according to a seventh embodiment of the present invention.

FIG. 15 is a flowchart illustrating a procedure of the correction operation by a voltage-command correction unit provided in an electric power converter according to a seventh embodiment of the present invention. In FIG. 15, the same letter or numeral is put for the same or similar processing procedure as the processing procedure shown in FIG. 12. In what follows, components related to the seventh embodiment will be mainly explained.

As shown in FIG. 15, in the processing procedure shown in FIG. 12, the voltage-command correction unit provided in the electric power converter according to the seventh embodiment, in transition processes from ST14 to ST61, if the judgment at ST14 is negative (No), performs the processing of ST80, and then proceeds to ST61.

In ST80, by explaining with reference to FIG. 13, in the time period (2) from the first clock time 32 to the second clock time 40, the correction processing of the second clock time 40 is performed in accordance with the frequency f at every sample timing. In a steady state, because the frequency f is the same as the frequencies of the output current ix, the current command ix*, the output voltage vx, and the output command vx*, the correction can be performed using any one of these frequencies.

The correction of the second clock time 40 in accordance with the frequency f can be performed with the same idea as the correction method for the correction voltage switching clock time explained in ST40 in FIG. 9. That is, when the frequency f is not constant and the value changes, by using Equation (6) as well, the time variation amount ta of the value (the effective value Irms) of the output current ix from the first clock time 32 until reaching the second clock time 40, is calculated by successively integrating the variation of the frequency f at every sample timing by assuming that the value (the effective value Irms) of the output current ix is constant, and the second clock time 40 is corrected based on the calculation result; where, the clock time tx shown in Equation (6) is an arbitrary clock time that exists from the clock time t1 (the first clock time) to the clock time t2 (the second clock time).

As described above, according to the seventh embodiment, before switching the polarity of the correction voltage, the second clock time is successively corrected in accordance with the variation of the frequency, and the polarity of the correction voltage is switched based on the corrected second clock time, thereby enabling to switch the polarity of the correction voltage more accurately even when the frequency fluctuates due to a load fluctuation and a speed fluctuation and attaining an advantageous effect capable of further reducing the voltage error near the zero cross point of the output current.

Eighth Embodiment

Figure 16:
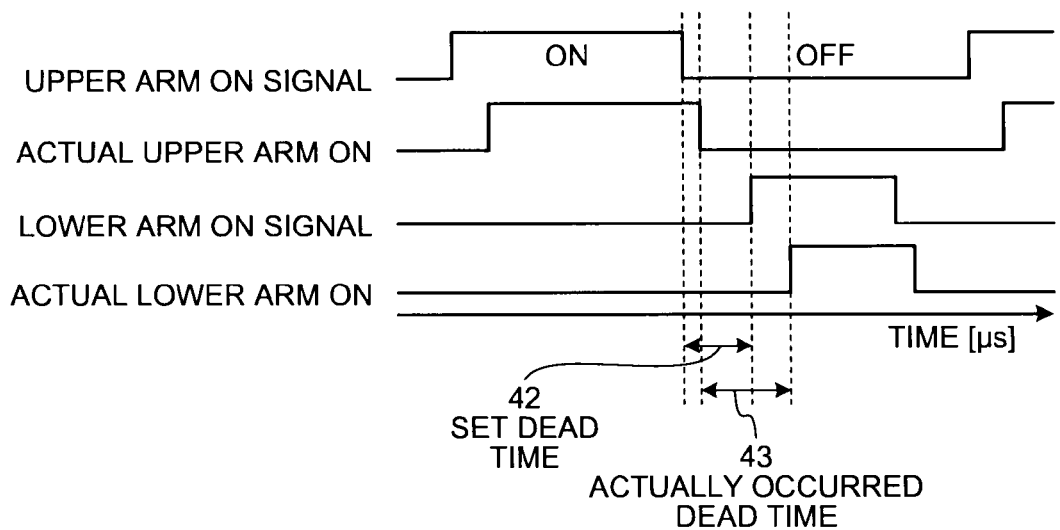
FIG. 16 is a diagram illustrating necessity to perform an amplitude adjustment of a correction voltage according to an eighth embodiment of the present invention.
Figure 17:
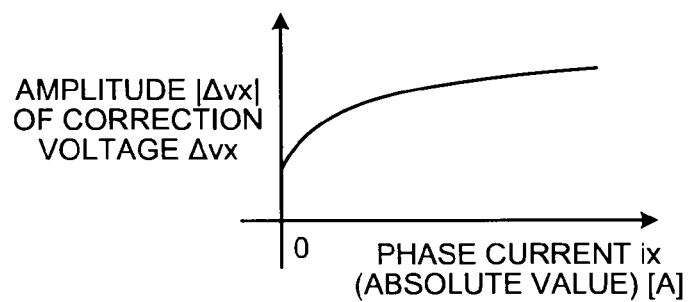
FIG. 17 is a diagram showing an example of a relation property table between amplitude of a correction voltage and a value of an output current used in the amplitude adjustment of the correction voltage.

In an eighth embodiment, a method for adjusting the amplitude of the correction voltage generated by the voltage-command correction unit is explained above with reference to FIGS. 16 and 17. FIG. 16 is a diagram illustrating necessity to perform an amplitude adjustment of the correction voltage according to the eighth embodiment of the present invention. FIG. 17 is a diagram showing an example of a relation property table between the amplitude of the correction voltage and the value of the output current used in the amplitude adjustment of the correction voltage.

As explained in the first embodiment, the magnitude (the absolute value) of an error that occurs caused by the dead time between the AC voltage command vx* output from the voltage-command calculation unit 6a and the output voltage vx from the electric-power conversion unit 3 is theoretically obtained by the product |Verr| of the carrier frequency [Hz], the DC link voltage [V] of the electric-power conversion unit 3, and the dead time [sec]. However, the theory presupposes that the timing of actually turning on or off the power device elements of the upper and lower arms that configure the electric-power conversion unit 3 matches with a desired timing specified by the drive signal.

In FIG. 16, relations between the ON signals, which are drive signals, of the upper and lower arms, and the actually performed ON operations of the upper and lower arms, and a relation between a set dead time 42 and an actually occurred dead time 43 are shown. As shown in FIG. 16, the dead times 42 and 43 are defined as a time interval between an off-operation time of the upper arm and an on-operation time of the lower arm.

Because the power device elements of the upper and lower arms that configure the electric-power conversion unit 3 have a switching delay, as shown in FIG. 16, for the ON and OFF operation timings specified by the ON signals, which are drive signals, of the upper and lower arms, the actually performed ON and OFF operation timings of the upper and lower arms delay by the switching time. The time of this switching delay often differs between the on-operation time and the off operation time, and changes depending on the value of the output current ix. For this reason, an error occurs between the set dead time 42 and the actually occurred dead time 43, as shown in FIG. 16. Therefore, if the amplitude |Δvx| of the correction voltage Δvx is set to the same value as the product |Verr|, the correction voltage Δvx may become over corrected or under corrected for the actually occurred voltage error, causing an error by the voltage correction.

Consequently, in order to reduce the error by the voltage correction, as shown, for example, in FIG. 17, a property table of the amplitude |Δvx| of the correction voltage Δvx that varies in accordance with the output current ix is recorded in the voltage-command correction units 7a and 7b beforehand to make it possible to adjust the amplitude |Δvx| of the correction voltage Δvx in accordance with the output current ix by successively calculating the amplitude |Δvx| thereof at every sample timing.

This makes it possible to optimally adjust the amplitude |Δvx| of the correction voltage at every sample timing, thereby enabling to reduce the amplitude error of the correction voltage caused by the switching delay of the power device elements of the upper and lower arms that configure the electric-power conversion unit 3 and further enhancing the correction accuracy of the voltage error. It is also possible to adjust the amplitude |Δvx| of the correction voltage Δvx in accordance with the current command ix* by creating a property table as shown in FIG. 17 using the current command ix* in place of the output current ix.

Next, for the processing in ST11 in FIGS. 2, 8, 9, 11, 12, 14, and 15, various aspects can be realized, so these aspects are collectively explained below with reference to FIG. 3.

(A) The upper limit value ΔI1 and the lower limit value −ΔI2 of the current range 30 set in ST11 can be adjusted and set in accordance with the output current ix. In the first embodiment, it was shown to be only necessary to adjust the clock time 38 for switching the polarity of the correction voltage Δvx based on the first clock time 32 and either one of Equations (1) to (3). However, the period from the first clock time 32 to the zero cross point 31 at which the polarity of the output current ix is switched obtained by applying Equation (1) or Equation (2) is a theoretical time by assuming that the theoretical time is sufficiently short for the AC cycle as described above.

For this reason, if the output current ix is small, the upper limit value ΔI1 and the lower limit value −ΔI2 of the current range 30 are preferable to be adjusted and set to make them small so that the period from the first clock time 32 to the clock time 38 for switching the polarity of the correction voltage Δvx does not become long for the AC cycle.

Consequently, if the upper limit value ΔI1 and the lower limit value −ΔI2 are adjusted by increasing and decreasing these values by successively calculating these values according to the output current ix at every sample timing to set the current range 30, the period from the first clock time 32 to the zero cross point 31 that is the clock time when the polarity of the output current ix switches does not become too long for the AC cycle regardless of the value of the output current ix, thereby enabling to adjust and set the current range 30 having the optimum upper limit value ΔI1 and lower limit value −66 I2 so that the clock time 38 for switching the polarity of the correction voltage Δvx can be accurately set to the zero cross point 31.

In addition, when adjusting the upper limit value ΔI1 and the lower limit value −ΔI2 of the current range 30, any one of the effective value, the amplitude value, and the instantaneous value can be used for the value of the output current ix. Alternatively, the current command ix* can be used for the value of the output current ix.

(B) The upper limit value ΔI1 and the lower limit value −ΔI2 of the current range 30 set in ST11 can be adjusted and set in accordance with the frequency f. In this situation, because the frequency f is the same as the frequencies of the output current ix, the current command ix*, the output voltage vx, and the output command vx* in the steady state, any one of these frequencies can be used.

For example, if the voltage-command calculation units 6a and 6b are controlled so that the ratio between the AC voltage command vx* and the frequency f becomes constant, the output voltage vx also increases as the frequency f increases. On the other hand, because the correction voltage Δvx becomes nearly a constant value regardless of the frequency f, the correction voltage Δvx for the output voltage vx becomes relatively small. Therefore, at the clock time 38 when the polarity of the correction voltage Δvx switches, the variation amount of the correction voltage Δvx becomes small, the variation of the output current ix is small, and a current chattering phenomenon near the zero cross point 31 of the current is liable to occur.

If the upper limit value ΔI1 and the lower limit value −ΔI2 of the current range 30 are adjusted by increasing and decreasing these values by successively calculating these values in accordance with, for example, the frequency f of the AC voltage command vx* at every sample timing to set the current range 30, these values can be adjusted so as to expand the current range 30 as the frequency f increases, thereby enabling to prevent the chattering phenomenon from occurring near the zero cross point 31 of the current.

(C) The upper limit value ΔI1 and the lower limit value −ΔI2 of the current range 30 set in ST11 can be constant values. In this situation, the upper limit value ΔI1 and the lower limit value −ΔI2 can be set to the same value or can be adjusted to different values with each other by taking a fact that an offset is sometimes added to the output current ix depending on the performance of the current detection unit 4 into account.

It is preferable to obtain beforehand the current range 30 in which the polarity of the output current ix is not erroneously detected due to the phenomenon that an offset is added to the output current ix by the current detection unit 4 or due to the current chattering phenomenon near the zero cross point 31 of the current, and then set each value of the upper limit value ΔI1 and the lower limit value −ΔI2.

If the relation between the current range 30, in which the polarity of the output current ix is not erroneously detected, and the ratings of the electric power converters 1a and 1b or the ratings of the AC loads 2a and 2b is known, each value of the upper limit value ΔI1 and the lower limit value −ΔI2 can be set based on these ratings.

When the upper limit value ΔI1 and the lower limit value −ΔI2 of the current range 30 are set to constant values as described above, if the upper limit value ΔI1 and the lower limit value −66 I2 are once memorized in the voltage-command correction units 7a and 7b, the upper limit value ΔI1 and the lower limit value −ΔI2 of the current range 30 need not be always calculated during the operation of the electric power converters 1a and 1b. Therefore, the calculation amounts to perform in the control devices 5a and 5b of the electric power converters 1a and 1b can be reduced, thereby enabling to reduce the loads of microcomputers housed in the control devices 5a and 5b and other computers.

(D) In the fourth embodiment, the fact that the value (the effective value Irms) of the output current ix changes in accordance with the torque command τ* is shown by Equation (8). For this reason, in FIG. 11 (the fourth embodiment), the upper limit value ΔI1 and the lower limit value −66 I2 of the current range 30 set in ST11 can be adjusted and set by calculating these values successively in accordance with the torque command τ* at every sample timing.

Even with this method, the period from the first clock time 32 to the zero cross point 31 that is the clock time when the polarity of the output current ix switches does not become too long for the AC cycle, thereby enabling to adjust and set the current range 30 having the optimum upper limit value ΔI1 and lower limit value −ΔI2 so that the clock time 38 for switching the polarity of the correction voltage Δvx can be accurately set to near the zero cross point 31.

In addition, as similar to ST50, ST51 in FIG. 11 (the fourth embodiment), in place of the torque command τ*, the upper limit value ΔI1 and the lower limit value −ΔI2 of the current range 30 can be adjusted in accordance with a load torque τ of the rotary machine 2b that is detected in some way or in accordance with the torque current iq that is obtained based on Equation (4) or Equation (7).

INDUSTRIAL APPLICABILITY

As described above, an electric power converter according to the present invention is advantageously used as the electric power converter that reduces the voltage error caused by the dead time near the zero cross point of the output current and outputs the AC power just as the voltage command from the electric-power conversion unit.

The invention claimed is:

1. An electric power converter that includes an electric-power conversion unit that generates an AC power to be supplied to an AC load in accordance with an AC voltage command input thereto, a voltage-command calculation unit that calculates an AC voltage command with a frequency to be applied to the electric-power conversion unit, and a current detection unit that obtains an output current that is a current component in the AC power that the electric-power conversion unit supplies to the AC load, the electric power converter comprising:

a voltage-command correction unit that is provided between the electric-power conversion unit and the voltage-command calculation unit, and that calculates, based on a voltage error caused by a dead time in the electric-power conversion unit, a correction voltage to correct the AC voltage command that the voltage-command calculation unit has obtained, adds the correction voltage to the AC voltage command that the voltage-command calculation unit has obtained, and applies the AC voltage command to the electric-power conversion unit, wherein the voltage-command calculation unit provides a predetermined current range including a zero level for the output current, and, at a first clock time when a value of the output current enters from outside to inside of the current range, obtains a zero cross timing of the output current using the first clock time and the frequency, and sets the zero cross timing as a clock time for switching a polarity of the correction voltage.

2. The electric power converter according to claim 1, wherein the voltage-command correction unit obtains the zero cross timing of the output current using the first clock time, the frequency, and the output current.

3. The electric power converter according to claim 1, wherein the voltage-command correction unit adjusts and sets an upper limit value in a positive polarity side and a lower limit value in a negative polarity side with respect to the zero level in the current range in accordance with the output current.

4. The electric power converter according to claim 1, wherein the voltage-command correction unit adjusts and sets an upper limit value in a positive polarity side and a lower limit value in a negative polarity side with respect to the zero level in the current range in accordance with the frequency.

5. The electric power converter according to claim 1, wherein the voltage-command correction unit adjusts and sets an upper limit value in a positive polarity side and a lower limit value in a negative polarity side with respect to the zero level in the current range in accordance with a constant value.

6. The electric power converter according to claim 1, wherein the voltage-command correction unit corrects the clock time for switching the polarity of the correction voltage in accordance with the output current in a period after the first clock time until reaching the clock time for switching the polarity of the correction voltage.

7. The electric power converter according to claim 1, wherein the voltage-command correction unit corrects the clock time for switching the polarity of the correction voltage in accordance with the frequency in a period after the first clock time until reaching the clock time for switching the polarity of the correction voltage.

8. The electric power converter according to claim 1, wherein the voltage-command correction unit adjusts amplitude of the correction voltage in accordance with the output current when calculating the correction voltage to correct an AC voltage command that the voltage-command correction unit has obtained.

9. An electric power converter that includes an electric-power conversion unit that generates an AC power to be supplied to a rotary machine, which is an AC load, in accordance with an AC voltage command input thereto, a voltage-command calculation unit that calculates an AC voltage command with a frequency to be applied to the electric-power conversion unit in accordance with a torque command that gives a control parameter for the rotary machine, a torque command setting unit that generates the torque command, and a current detection unit that obtains an output current that is a current component in the AC power that the electric-power conversion unit supplies to the rotary machine, the electric power converter comprising:

a voltage-command correction unit that is provided between the electric-power conversion unit and the voltage-command calculation unit, and that calculates, based on a voltage error caused by a dead time in the electric-power conversion unit, a correction voltage to correct the AC voltage command that the voltage-command calculation unit has obtained, adds the correction voltage to the AC voltage command that the voltage-command calculation unit has obtained, and applies the AC voltage command to the electric-power conversion unit, wherein the voltage-command calculation unit provides a predetermined current range including a zero level for the output current, and, at a first clock time when a value of the output current enters from outside to inside of the current range, obtains a zero cross timing of the output current using the first clock time, the frequency, and the torque command, and sets the zero cross timing as a clock time for switching a polarity of the correction voltage.

10. An electric power converter that includes an electric-power conversion unit that generates an AC power to be supplied to an AC load in accordance with an AC voltage command input thereto, a voltage-command calculation unit that calculates an AC voltage command with a frequency to be applied to the electric-power conversion unit, and a current detection unit that obtains an output current that is a current component in the AC power that the electric-power conversion unit supplies to the AC load, the electric power converter comprising:

a voltage-command correction unit that is provided between the electric-power conversion unit and the voltage-command calculation unit, and that calculates, based on a voltage error caused by a dead time in the electric-power conversion unit, a correction voltage to correct the AC voltage command that the voltage-command calculation unit has obtained, adds the correction voltage to the AC voltage command that the voltage-command calculation unit has obtained, and applies the AC voltage command to the electric-power conversion unit, wherein the voltage-command calculation unit provides a predetermined current range including a zero level for the output current, and, at a first clock time when a value of the output current enters from outside to inside of the current range, obtains a zero cross timing of the output current using the first clock time and the frequency, sets the zero cross timing as a second clock time, switches a polarity of the correction voltage at the second clock time in a case that the polarity of the correction voltage in the second clock time differs from a polarity of the AC voltage command that the voltage-command calculation unit has obtained, and switches the polarity of the correction voltage when the polarity of the AC voltage command that the voltage-command calculation unit has obtained switches in a case that the polarity of the correction voltage in the second clock time is same as the polarity of the AC voltage command that the voltage-command calculation unit has obtained.

11. The electric power converter according to claim 10, wherein the voltage-command correction unit obtains the zero cross timing of the output current using the first clock time, the frequency, and the output current.

12. The electric power converter according to claim 10, wherein the voltage-command correction unit adjusts and sets an upper limit value in a positive polarity side and a lower limit value in a negative polarity side with respect to the zero level in the current range in accordance with the output current.

13. The electric power converter according to claim 10, wherein the voltage-command correction unit adjusts and sets an upper limit value in a positive polarity side and a lower limit value in a negative polarity side with respect to the zero level in the current range in accordance with the frequency.

14. The electric power converter according to claim 10, wherein the voltage-command correction unit adjusts and sets an upper limit value in a positive polarity side and a lower limit value in a negative polarity side with respect to the zero level in the current range in accordance with a constant value.

15. The electric power converter according to claim 10, wherein the voltage-command correction unit corrects the clock time for switching the polarity of the correction voltage in accordance with the output current in a period after the first clock time until reaching the second clock time.

16. The electric power converter according to claim 10, wherein the voltage-command correction unit corrects the clock time for switching the polarity of the correction voltage in accordance with the frequency in a period after the first clock time until reaching the second clock time.

\* \* \* \* \*